(12) United States Patent
Matsuura et al.

(10) Patent No.: US 8,273,252 B2
(45) Date of Patent: Sep. 25, 2012

(54) SOLUTION REACTOR AND METHOD FOR SOLUTION REACTION

(75) Inventors: Kazuo Matsuura, Naruto (JP); Susumu Nii, Nagoya (JP)

(73) Assignee: Ultrasound Brewery, Tokushima (JP)

( * ) Notice: Subject to any disclaimer, the term of this patent is extended or adjusted under 35 U.S.C. 154(b) by 1156 days.

(21) Appl. No.: 11/921,466

(22) PCT Filed: Jun. 2, 2006

(86) PCT No.: PCT/JP2006/311126
§ 371 (c)(1),
(2), (4) Date: Dec. 3, 2007

(87) PCT Pub. No.: WO2006/129807
PCT Pub. Date: Dec. 7, 2006

(65) Prior Publication Data
US 2008/0190862 A1 Aug. 14, 2008

(51) Int. Cl.
*C02F 1/32* (2006.01)

(52) U.S. Cl. ......... 210/748.01; 210/748.02; 210/748.04; 210/198.1; 210/749; 422/127; 422/128; 239/102.2

(58) Field of Classification Search .. 210/748.01–748.1, 210/151, 198, 771, 749, 205, 198.1; 422/22, 422/186, 186.04, 127, 128; 250/437, 438, 250/436
See application file for complete search history.

(56) References Cited

U.S. PATENT DOCUMENTS

| | | | |
|---|---|---|---|
| 4,308,241 A | 12/1981 | deVries | |
| 4,465,234 A * | 8/1984 | Maehara et al. | ........... 239/102.2 |
| 5,845,846 A | 12/1998 | Watanabe et al. | |
| 6,287,465 B1 * | 9/2001 | Watanabe et al. | ............. 210/192 |
| 6,338,472 B1 | 1/2002 | Shimazu et al. | |
| 6,587,465 B1 | 7/2003 | Dempo | |
| 6,901,926 B2 * | 6/2005 | Yamamoto et al. | ...... 128/200.16 |

FOREIGN PATENT DOCUMENTS

| | | |
|---|---|---|
| JP | 50-6154 A | 1/1975 |
| JP | 53-6274 A | 1/1978 |
| JP | 54-8706 U | 1/1979 |
| JP | 8-281155 A | 10/1996 |
| JP | 09-239383 A | 9/1997 |
| JP | 10-165757 A | 6/1998 |
| JP | 2003-326285 A | 11/2003 |

* cited by examiner

*Primary Examiner* — Joseph Drodge
*Assistant Examiner* — Cameron J Allen
(74) *Attorney, Agent, or Firm* — Birch, Stewart, Kolasch & Birch, LLP

(57) ABSTRACT

A solution reactor allows the solution L to contact with the reactant gas G, and the component contained in the solution L is chemically changed by means of the reactant gas G. The reactor includes a nozzle 41 for spraying the solution L into a state of mists M, and a pressure feed unit 42 for feeding the reactant gas G, which is pressurized, into the nozzle 41. Further, in the reactor, the pressure feed unit 42 feeds such pressurized reactant gas G to the nozzle 41 to be flown fast, so that the nozzle 41 allows the fast flowing reactant gas G to contact with the solution and the solution L is broken into the state of mists M to be jetted out, and thus the component contained in the solution L is chemically changed by means of the reactant gas G.

23 Claims, 13 Drawing Sheets

SOLUTION REACTOR AND METHOD FOR SOLUTION REACTION

TECHNICAL FIELD

The present invention relates to a reactor and a method for reaction, in which an organic matter and others contained in a solution, mainly such as a waste liquid, are decomposed by means of oxidation or reduction.

BACKGROUND ART

Colored waste water emitted from a dye house can be changed to colorless, clean water by oxidatively decomposing an organic matter such as dye contained in the waste water. For realization of such a treatment, there has been developed a bubbling method for jetting an oxidative gas, such as ozone, in a state of a bubble into the waste liquid. The bubbled ozone serves as an oxidative gas to decompose and decolorize the dye contained in the waste water. This method makes the waste water clean under the oxidative reaction of the solution, which is caused by a gas-liquid contact. In this method, a tower called a bubble tower is filled with the waste water, and fine bubbles are injected from a bottom portion of the tower. The bubbles go up in the waste water within the bubble tower, and in the course of the bubbles going up to reach the liquid surface, the oxidative gas contained in the bubbles oxidatively decomposes the dye and others to make the waste water clean.

This method, however, presents the following drawbacks.

(1) A finer bubble has to be produced to enlarge a surface area of the bubble, because a speed of reaction is dependent on the surface area of the bubble, i.e., on a diameter of each individual bubble. In order to produce fine bubbles, however, an involved structure does not only become complicated but energy consumption becomes larger accordingly. Further, even when the bubbles are initially fine enough, the bubbles contact one another in the waste water to coalesce, being prone to have an enlarged bubble radius. For such reasons, there exists a problem that a gas-liquid interfacial area decreases which stipulates the speed of reaction.

(2) Further, even if a fine bubble is to be injected, the oxidative gas in the bubble is only able to express an oxidation power to the extent of a gas amount contained in the bubble. That is to say, when the oxidative gas contained in the fine bubble has been exhausted after consumption, the oxidation power is lost even if the bubble goes up while in contact with the waste water. The amount of oxidative gas decreases in accordance with a smaller size of the bubble. For this reason, the smaller the bubble diameter is, the faster the consumption of the oxidative gas is, which means that the oxidation power becomes lost within a shorter time while the bubble goes up in the waste water. As a result, an oxidative gas concentration in the waste water is higher only in the vicinity of the bubble producing unit, making it difficult or impossible for the oxidative gas concentration to be distributed uniformly in the waste water.

(3) Furthermore, when a reaction progresses near a gas-liquid interface, two kinds of transfer phenomena have to be simultaneously proceeded that are a supply of a pre-oxidized substance and a removal of an oxidized product between the oxidative gas in the bubble and the surface of the waste liquid. In order to prompt the reaction, a mixed phase of the waste water and the bubble has to be vehemently agitated so that the two kinds of transfer phenomena may be accelerated. However, there are limits to the speed of transfer for the substance contained in the waste water, which constitutes a factor that the speed of transfer limits the speed of reaction involved in the entire reactor.

As a reaction method to remedy such drawbacks, there has been developed a method of spraying a solution into an ozone gas. Refer to the Patent Documents 1 and 2.

Patent Document 1: Japanese Patent Laid-Open Publication No. 2003-326285

Patent Document 2: Japanese Patent Laid-Open Publication No. H09-239383 (1997)

DISCLOSURE OF THE INVENTION

Problem to be Solved by the Invention

Described in the Patent Document 1 is a waste water treatment system of removing a contaminant in waste water which is oxidized and decomposed by means of a UV ray and ozone. In the waste water treatment system, the waste water is sprayed from a spraying nozzle in a spraying type reaction tank into a reaction tank. The contaminant dissolved in a sprayed fine particle comes in contact with and absorbs the UV ray irradiated from the UV light and the ozone gas delivered from an ozone supply unit, so that the contaminant is decomposed and removed under the effect of synergistic oxidation. Further, a volatile organic chlorine compound and others, which are vaporized and separated within the spraying type reaction tank, are introduced via a condenser into a gas phase reaction tank, together with an unused ozone gas. The gaseous contaminant sent into the gas phase reaction tank comes in contact with and absorbs the unused ozone (when an ozone concentration is found to be suffering shortage by using an ozone concentration sensor, the ozone is partially replenished from an ozonizer) under exposure to the UV ray irradiated from the UV light, and the contaminant is decomposed and removed under the effect of a synergistically oxidative decomposition reaction.

Further described in the Patent Document 2 is a method of decolorizing a dye waste liquid. In the method, the dye waste liquid is sprayed into the ozone atmosphere, and the ozone is allowed to contact with the dye waste liquid, so that after a dye in the dye waste liquid is oxidatively decolorized, the ozone is decomposed and removed. The involved reactor includes an ozonizer, a reaction vessel into which the ozone produced by the ozonizer is supplied, a dye waste liquid sprayer for spraying the dye waste liquid into the reaction vessel, and an ozone eliminator for decomposing and eliminating the ozone in the reaction vessel.

The methods described in such documents respectively allow the solution such as the waste water and the dye waste liquid to be sprayed in a state of fine mists into the ozone gas and ozone atmosphere, so that the mists are in contact with the ozone to chemically change the solution as undergoing the oxidation, decomposition and decolorization. When compared with the bubbling method of allowing the ozone to float in a state of bubbles in the solution such as the waste water and waste liquid, the above described methods allow for a quick, chemical change by enlarging a size of contact area between the solution and the ozone. Further, since the solution is sprayed in a state of fine mists into the ozone, the chemical change is made possible while in contact with the ozone until the solution has been chemically changed.

It should be noted, however, that these methods are unable to achieve fully satisfactory efficiency of chemically changing the solution in every kind of application. In particular, the treatment of the waste water and waste liquid is required to efficiently dispose of a huge amount of solution within a shorter time, which means that a further improved method is needed for chemically changing the solution by means of the ozone in a more efficient and quicker manner.

The present invention has been made in order to realize such a requirement. It is the primary object of the present invention to provide a reactor and a reaction method for allowing for a chemical reaction of the component contained in the solution by means of a reactant gas in a very efficient and quick manner, which is made possible by designing to keep the solution and the reactant gas in a state of ideal gas-liquid interface.

Means for Solving Problems

The solution reactor according to the first aspect of the present invention is so designed as to allow a solution L to contact with a reactant gas G so that a component contained in the solution L is chemically changed by means of the reactant gas G. The reactor includes a nozzle 41 for spraying the solution L into a state of mists M; and a pressure feed unit 42 for feeding into the nozzle 41 the reactant gas G which is pressurized. Further, in regard to the reactor, the pressure feed unit 42 feeds such pressurized reactant gas G into the nozzle 41 and allows the gas to flow fast; the nozzle 41 allows such fast flowing reactant gas G to contact with the solution L; the solution L is broken into the mists M and jetted out of the nozzle 41; and thus the component contained in the solution L is chemically changed by the reactant gas G.

The nozzle 41 may include an injection path 46 for jetting the pressurized reactant gas G through the path; and a solution path 47 for feeding the solution L to the injection path 46. The nozzle 41 is so designed that the solution L fed out of the solution path 47 is atomized into the mists M by means of the reactant gas G which is jetted through the injection path 46.

The nozzle 41 can include a smooth surface 60 in the nozzle for allowing the fed solution L to flow along the smooth surface in a flowing direction; and the injection path 46 for jetting the reactant gas G in the flowing direction of the solution L along the smooth surface 60. The nozzle 41 is so designed that the solution L flowing along the smooth surface 60 is stretched in the flowing direction by means of the reactant gas G jetted through the injection path 60 along the smooth surface 60, so that the solution L is sprayed in the state of the mists M from a tip of the smooth surface 60.

Further, in the inventive solution reactor, the solution L may contain an organic substance which is oxidatively decomposable by contacting with ozone, and the reactant gas G may be air that contains ozone.

The method for solution reaction according to the second aspect of the present invention is so designed as to allow a solution L to contact with a reactant gas G so as to chemically change a component contained in the solution L by means of the reactant gas G. According to the reaction method, the reactant gas G, which is pressurized, is fed into a nozzle 41 for spraying the solution L in a state of mists M; the reactant gas G is flowed fast by the nozzle 41; such fast flowing reactant gas G is allowed to contact with the solution L; the solution L is broken into the mists M and jetted out of the nozzle 41; and thus the component contained in the solution L is chemically changed by the reactant gas G.

According to the inventive reaction method, the nozzle 41 allows the pressurized reactant gas G to be jetted to an injection path 46; the solution L is fed to the injection path 46; and thus the solution L can be atomized into the mists M by means of the reactant gas G.

According to the inventive reaction method, the nozzle 41 allows the fed solution L to flow along a smooth surface 60; the reactant gas G is jetted in a flowing direction of the solution L; the solution L flowing along the smooth surface 60 is stretched in the flowing direction by means the reactant gas G jetted along the smooth surface 60; and thus the mists M can be sprayed from a tip of the smooth surface 60.

The solution reactor according to the third aspect of the present invention is so designed as to allow a solution L to contact with a reactant gas G so as to chemically change a component contained in the solution L by means of the reactant gas G. The reactor includes an ultrasonic vibrator 2 for ultrasonically vibrating the solution L to be atomized into a state of mists M; an ultrasonic power source 3, connected to the ultrasonic vibrator 2, for supplying high-frequency electric power to the ultrasonic vibrator 2 to provide an ultrasonic vibration; and a reaction unit 31 for allowing the reactant gas G to contact with the mists M which are atomized by the ultrasonic vibrator 2. The reactor is so designed that the solution L is atomized by the ultrasonic vibrator 2 into the mists M; that such atomized mists M are allowed to contact with the reactant gas G; and thus a component contained in the solution L is chemically changed by means of the reactant gas G.

The solution reactor according to the fourth aspect of the present invention is so designed that a barrel 6 opened at a top end of a spray opening 12 is disposed superjacent to the ultrasonic vibrator 2, so that the ultrasonic vibrator 2 provides an ultrasonic vibration to the solution L toward the spray opening 12 of the barrel 6, and thus the solution L, atomized into a form of the mists M, is discharged from the spray opening 12. Further, the barrel 6 has a gas nozzle 14 opened for feeding the reactant gas G to the mists M sprayed from the spray opening 12; and the gas nozzle 14 is connected to the supply source 32 of the reactant gas G. The reactor is so designed that the reactant gas G fed out of the supply source 32 is fed from the gas nozzle 14 to the mists M; that the mists M sprayed from the spray opening 12 are fed into the reactant gas G; and thus the atomized mists M are allowed to contact with the reactant gas G.

The barrel 6 may be either cylindrical, or of a conical horn that is tapered off toward the spray opening 12, or of an exponential horn. Further, the barrel 6 may be formed with the gas nozzle 14 opened to circumferentially surround the spray opening 12.

Further, the inventive solution reactor may be so designed that the solution L contains an organic matter that is oxidatively decomposable by contacting with ozone, and that the reactant gas G is air that contains the ozone.

The method for solution reaction according to the fifth aspect of the present invention is so designed as to allow a solution L to contact with a reactant gas G so as to chemically change a component contained in the solution L by means of the reactant gas G. In the reaction method, the solution L is ultrasonically vibrated to be atomized in a state of mists M; the reactant gas G is allowed to contact with such atomized mists M; and thus the component contained in the solution L is chemically changed by means of the reactant gas G.

The method for solution reaction according to the sixth aspect of the present invention is so designed that the solution L is filled in a barrel 6 having a spray opening 12 opened at a top end of the spray opening; that an ultrasonic vibration is provided to the solution L within the barrel 6 toward the spray opening 12; that the solution L is atomized into the state of the mists M; such mists M are discharged from the spraying nozzle 12; that the reactant gas G is fed to the mists M sprayed from the spray opening 12; and thus the mists M sprayed from the spray opening 12 are allowed to contact with the reactant gas G.

Effects of the Invention

A reactor according to the first and second aspect of the present invention carry the advantage that a gas-liquid interface between a solution and a reactant gas is maintained in an ideal state, so that a component contained in the solution can be subjected to a chemical reaction in a very efficient and quick manner. This is because the reactor and the reaction method allow the reactant gas, which is pressurized, to be fed to a nozzle for spraying the solution in a state of mists; the solution is allowed to contact with the reactant gas which is fast flown by means of the nozzle; the solution is broken into the mists to be jetted; and the component contained in the solution is chemically changed by means of the reactant gas. The reactor and the reaction method are designed to allow the fast flowing reactant gas to vehemently contact with the solution so that the solution is broken into pieces, and thus the solution is atomized into fine mists to be jetted. As a result, in the reactor and the reaction method, the solution and the reactant gas are allowed to contact each other in an ideal state of vehement agitation at the gas-liquid interface between the solution and the reactant gas, and thus the component contained in the solution can be chemically changed in a quick and efficient manner.

Further, a reactor in according to the third aspect of the present invention carry the advantage that a solution is ultrasonically vibrated to be atomized into a state of mists; a reactant gas is allowed to contact with such atomized mists; and a component contained in the solution is chemically changed by means of the reactant gas, so that a gas-liquid interface between the solution, atomized by means of an ultrasonic vibration into the mists, and the reactant gas is maintained in an ideal state, and thus the component contained in the solution can be subjected to a chemical reaction in a very efficient and quick manner.

In particular, a reactor according to the fourth and fifth aspect of the present invention allow a solution to be filled in a barrel which has a spray opening opened at a top end of the barrel, so that an ultrasonic vibration is provided to the solution in the barrel to allow the solution to be atomized into a state of mists and discharged from the spray opening, and thus the solution can be atomized by means of the ultrasonic vibration into a state of the mists in an efficient manner. Therefore, while the reactor and the reaction method allow the solution to be atomized by means of the ultrasonic vibration into the state of the mists, such atomized mists can be subjected to a chemical reaction by means of the reactant gas in a quick and efficient manner.

BEST MODE FOR CARRYING OUT THE INVENTION

Embodiments in accordance with the present invention shall be described hereinafter in conjunction with the accompanying drawings. It should be noted, however, that the ensuing description of embodiments is merely illustrative of a solution reactor and a reaction method only to embody technical ideas conceived in the present invention and that the invention shall in no way be limited to the reactor and reaction method as described below.

To add, in the present disclosure, reference numerals corresponding to members shown in the embodiments are affixed to members shown in the "CLAIMS" and "MEANS FOR SOLVING PROBLEMS" in order to facilitate a better understanding of the claims. However, those members shown in the claims shall in no way be specified to those members shown in the embodiments.

The inventive reactor is so designed as to allow a solution to contact with a reactant gas, so that a component contained in the solution is chemically changed by means of the reactant gas. The solution to be used is a waste water and others that are emitted from factories and contain a hazardous substance, and the solution is the one in which the hazardous substance can be reacted and decomposed by means of a reactant gas. When the solution is a waste water emitted from a factory, the hazardous substance contained in the waste water can be oxidized, reduced or decomposed to be eliminated, or can be detoxified for treatment of the waste water. On the other hand, when the solution is dye waste water, the hazardous substance contained in a colorized, dye waste water can be chemically reacted as by means of oxidation, reduction or decomposition for treatment into colorless, clean waste water. However, the solution is not specifically limited to a waster water, and every kind of reactive solution may be used that can be reacted by allowing a contained component to contact with the reactant gas.

The reactor shown in FIG. 1 includes a nozzle 41 for spraying the solution L into a state of mists M, a pressure feed unit 42 for feeding a pressurized reactant gas G to the nozzle 41, and a collection unit 45 connected to a discharge side of the pressure feed unit 42. FIG. 2 is a cross-sectional view of the nozzle 41. The illustrated nozzle 41 includes an injection path 46 for jetting the pressurized reactant gas G, and a solution path 47 for feeding the solution L to the injection path 46. In order to make a velocity of the fed reactant gas G faster, the injection path 46 has a Venturi portion 46A with a narrowed feed portion for the solution L. The nozzle 41 allows the pressurized gas G, which is fed out of the pressure feed unit 42, to flow fast inside. The velocity is increased especially at the Venturi portion 46A. The fast flowing reactant gas G is under a lower pressure at the Venturi portion 46A in accordance with the Bernoulli's theorem, so that the solution L is sucked in. The solution L taken in from the solution path 47 is broken into pieces by the fast flowing reactant gas G to be transformed into minute mists M and jetted out of the injection path 46. The solution path 47 is connected via a pump 50 to a stock solution tank 51 which stores the solution L, and the solution L continues to be fed out of the stock solution tank 51.

The nozzle 41 atomizes the solution L into a state of the mists M by means of the fast flowing reactant gas G and jets the solution L. At this stage, the reactant gas G vehemently contacts the solution L and breaks the solution L into pieces, and further the solution L is broken into fine mists M. As a result, the solution L is vehemently agitated by the reactant gas G at the gas-liquid interface as well as being broken into the fine mists M. For this reason, the solution L and the reactant gas G are in an ideal contact with each other at the gas-liquid interface, so that the component contained in the solution L is chemically changed by means of the reactant gas G in a quick and efficient manner.

The pressure feed unit 42 serves to feed the pressurized reactant gas G to the injection path 46 of the nozzle 41. The reactant gas G to be used is a gas which conducts a chemical reaction such as oxidation, reduction and decomposition of the component contained in the solution L. The reactant gas G for oxidizing the component contained in the solution L can be air that contains ozone. The ozone has a strong oxidation power next to fluorine, and decomposed ozone becomes oxygen, which is harmless to the surroundings and the human body. The ozone also has a property of selectively breaking a double bond of an organic substance, and is easier to be generated. Therefore, the air containing the ozone is optimally used as a reactant gas G for oxidizing the component contained in the solution L. It should be noted that the ozone can also be used alone as the reactant gas. In regard to the reactant gas for oxidizing the component contained in the solution L, it is also possible to use various kinds of oxidants other than the ozone, such as a gas of chlorine, alone or alternatively being blended in air. Further, as a reactant gas for reducing the component contained in the solution L, various kinds of reducing agents such as a gas of hydrogen can be used alone or in a state of being blended in air.

The pressure feed unit 42 shown in FIG. 1 serves to feed the ozone-contained air as a reactant gas G to the nozzle 41. The pressure feed unit 42 includes a compressor 48 for air to be forcibly sent, and an ozonizer 49 for generating ozone in the forced draft of air. The compressor 48 forcibly blows inhaled air to be supplied to the ozonizer 49. The ozonizer 49 generates ozone by discharging electricity into the air supplied from the compressor 48. The air containing the ozone generated by the ozonizer 49 is fed, now as a reactant gas G, to the nozzle 41 from the pressure feed unit 42. The illustrated pressure feed unit has an ozonizer disposed at a discharge side of the compressor, but the ozonizer can also be disposed at a feed side of the compressor.

A collection unit 45 coagulates the fine mists M, which are chemically changed by means of the reactant gas G, and the coagulated mists M are collected. The reactor shown in FIG. 1 has the nozzle 41 disposed in a reaction chamber 44 which is a closed space, in which the solution L is atomized by the reactant gas G into the mists M to be then jetted, so that the component contained in the solution L is chemically changed by means of the reactant gas G. The collection unit 45 is disposed at the discharge side of the reaction chamber 44, and the chemically changed mists M are coagulated for collecting the solution as chemically changed component. Further, the reactant gas which has chemically changed the component contained in the solution is forcibly sucked for collection by a pump, or is again fed back to the pressure feed unit, or is discharged into the air. In particular, when the reactant gas G is the ozone-contained air, the ozone after reaction becomes a harmless oxygen, which can be discharged into the air. It should be noted, however, that the whole portion of ozone in the reactant gas is not necessarily reacted, so that the air after reaction can be circulated back to the pressure feed unit to thus effectively and safely reuse the air that contains a residual ozone.

FIG. 3 through FIG. 6 respectively show a nozzle 41 with another structure. In the case of the nozzle 41 shown in FIG. 3, the mists M jetted out of the two nozzles 41 are collided mutually to make fine particles. Since the nozzle 41 with this structure collides mutually the reactant gas G and the mists M jetted from each of nozzles 41, a more ideal state of contact is obtained at the gas-liquid interface, and thus the component contained in the solution L is chemically changed by the reactant gas G in a quick and efficient manner.

In the nozzle 41 in FIG. 4 and FIG. 5 respectively, a first ring 53, a second ring 54 and a third ring 55, in order, are provided outside a center pole 52 to make up a structure of three-ply barrels so that a liquid is jetted in a ring form. The injection path 46 for the reactant gas G is provided between the center pole 52 and the first ring 53, the solution path 47 is provided between the first ring 53 and the second ring 54, and another injection path 46 is provided between the second ring 54 and the third ring 55. The injection path 46 and the solution path 47 is in a ring form, so that the reactant gas G is jetted out of the injection path 46 and the solution L is jetted out of the intermediate solution path 47 in a ring form. The solution L jetted out of the solution 47 is atomized into a state of mists M by means of the reactant gases G jetted out from both sides. In particular, the nozzle 41 is in a sharply pointed shape at its tip, with an interior circumferential surface of the first ring 53 and an exterior circumferential surface of the second ring 54 being of a smooth surface, so that the reactant gases G are allowed to flow fast along both of the inner and outer surfaces, and the reactant gases G from the both surfaces are collided at the tip. Because of such structure, the solution L fed out of the solution path 47 is broken into a state of fine mists M at the tips of the first ring 53 and the second ring 54. Therefore, in this nozzle 41 as well, the solution L and the reactant gas G are in an ideal state of contact at the gas-liquid interface at the tips of the first ring 53 and the second ring 54, and thus the component contained in the solution L is chemically changed quickly by means of the reactant gas G.

The nozzle 41 in FIG. 6 includes a solution path 47 for jetting the solution L in a ring form, a smooth surface 60 for allowing the solution L to flow which is jetted out of the solution path 47, and an injection path 46 for jetting the reactant gas G along the smooth surface 60. In the nozzle 41, an inner ring 57, a middle ring 58 and an outer ring 59, in order, are provided outside a center pole 56. The injection path 46 for the reactant gas G is provided between the center pole 56 and the inner ring 57, the solution path 47 is provided between the inner ring 57 and the middle ring 58, and the injection path 46 for the reactant gas G is provided between the middle ring 58 and the outer ring 59.

The inner ring 57 is of a circular wall at the outer contour, and the middle ring 58 is of a circular wall at the inner contour, so that the solution path 47 in a slit shape with a certain breadth is provided between the inner ring 57 and the middle ring 58. The solution path 47 is formed in a ring shape, with its slit breadth being designed to be of such a breadth as the solution L does not become clogged. The nozzle 41 does not require the solution L to be fed in a thin film state out of the solution path 47. This is because the solution L is stretched to be a thin film along the smooth surface 60 and is jetted out in fine particles. Therefore, the slit breadth of the solution path 47 is optimally designed, with a flowing amount of fed solution L, a length of the smooth surface 60, a velocity of the reactant gas G jetted along the smooth surface 60, an inner diameter of the solution path 47 and other factors being taken into consideration.

The diameter of the solution path 47 is optimally designed in view of the flowing amount of the jetted solution L, the size of the slit breadth and other factors. The diameter of the solution path 47 is designed to be about 50 mm(D, for example in the nozzle 41 for jetting the solution L at a rate of 1000 g/min. When the flowing amount is larger, the solution path 47 is designed to have an enlarged diameter, and when the flowing amount is smaller, the diameter is made smaller.

The upper circumference of the inner ring 57 and the tip surface of the middle ring 58 are cut into a tapered state to form a smooth surface 60. The smooth surfaces 60 at the inner ring 57 and the middle ring 58 are formed in a flush or coplanar state so that the flowing air jetted along the smooth surface 60 at the inner ring 57 may not become turbulent in the boundary between the inner ring 57 and the middle ring 58. The flush or coplanar state of the smooth surfaces 60 at the inner ring 57 and the middle ring 58 means the state in which the smooth surfaces 60 both at the inner ring 57 and at the middle ring 58 are not stepped, and that the air flows straightly along the smooth surface 60 at the inner ring 57 to the smooth surface 60 at the middle ring 58. Thus, when the smooth surfaces 60 at the inner ring 57 and at the middle ring 58 are to be tapered to become coplanar, it suffices that the inner ring 57 and the middle ring 58 are interconnected and then cut into a tapered state. Further, the smooth surface 60 is a smooth surface 60 running along the flowing direction of the solution L, so that the flowing solution L may not become turbulent. The smooth surface 60 of the nozzle 41, as illustrated, is finished into a conical, smooth surface 60 in its entirety.

When the inner ring 57 and the middle ring 58 are provided with a smooth surface 60 respectively, the solution path 47 is opened in the intermediate portion of the smooth surface 60. An angle of inclination of the smooth surface 60 provided at the inner ring 57 and the middle ring 58 is designed to form an obtuse angle with respect to the smooth surface 60 of the solution path 47, for example at 100-170 degrees, preferably 120-160 degrees, more preferably 130-160 degrees, and optimally about 150 degrees. When the angle of inclination a is larger, the flow of liquid becomes stabilized. However, an optimal value of the angle of inclination a is dependent on the slit breadth. The angle of inclination a is preferably designed not to exceed 2 mm in the opening width of the solution path 47 at the smooth surface 60.

A center pole 56 is disposed in the center of the inner ring 57, and a jet orifice 61 is opened between a tip of the center pole 56 and the inner ring 57. The center pole 56 has its outer circumferential surface formed to be tapered along the smooth surface 60 of the inner ring 57. The jet orifice 61 formed between the center pole 56 and the inner ring 57 is in a slit state, through which the pressurized air is jetted in a state of laminar flow to be flown fast along the smooth surface 60.

The injection path 46 of the inner ring 57 is connected to the pressure feed unit 42. The jet orifice 61 serves to jet the reactant gas G flowing along the smooth surface 60. The pressure feed unit 42 feeds into the jet orifice 61 the reactant gas of, for example, 3-20 kg/cm$^2$, preferably 4-15 kg/cm$^2$, more preferably 4-10 kg/cm$^2$, and optimally about 6.5 kg/cm$^2$. When a gas pressure of the reactant gas G is elevated, the velocity of the reactant gas G flowing fast along the smooth surface 60 is increased, so that the solution L is stretched to become thinner in a more effective manner, and thus the solution L can be made into fine particles of mists M.

Further, the nozzle 41 shown in FIG. 6 jets the reactant gas G from the outer circumference of the smooth surface 60 as well. The reactant gas G is jetted out of a jet orifice 62 for the reactant gas G, which is provided between the middle ring 58 and the outer ring 59. However, such reactant gas does not necessarily have to be jetted. This is because, without jetting the reactant gas from the outer jet orifice, the solution L can be jetted in a state of mists M of fine particles by means of the reactant gas G from the inner jet orifice 61. The nozzle 41 for jetting the reactant gas G from both orifices collide the reactant gas G at an edge 63 of the smooth surface 60, and thus the component contained in the solution L can be chemically reacted more effectively by means of the reactant gas G. This is because the mists M can be made into even finer particles, and also the solution L as well as the reactant gas G can be vehemently collided each other at the gas-liquid interface.

The nozzle 41 which jets two reactant gases G to be collided at the tip has a sharp-pointed edge 63 at the tip of the smooth surface 60. The middle ring 58 has the smooth surface 60 provided at the tip face, and the outer circumference of the tip is made cylindrical and is provided with the edge 63 at the tip of the smooth surface 60. The middle ring 58 in this shape can form the sharp-pointed edge 63 (180 degrees minus the angle of inclination α) at the tip of the smooth surface 60. However, the nozzle, although not illustrated, can also adjust the angle value of the edge by processing the outer circumference of the middle ring in a tapered state.

The nozzle 41 shown in FIG. 6 jets the solution L by forming into the solution L of fine particles in the following state.

(1) The pressurized reactant gas G is fed to the injection path 46 provided between the center pole 56 and the inner ring 57 and also to the injection path 46 provided between the middle ring 58 and the outer ring 59, so that the solution L is sent along the smooth surface 60 from the solution path 47 provided between the inner ring 57 and the middle ring 58.

(2) The solution L fed along the smooth surface 60 is stretched to become thinner by means of the reactant gas G which flows fast along the smooth surface 60, and the solution L forms a stream of thin film T.

For example, when the solution L is fed to the solution path 47 by allowing the reactant gas G to flow along the smooth surface 60 at a velocity of Mach 1.5, and if the velocity of the stream of thin film T at its tip is 1/20 of the reactant gas G, the velocity of 25.5 m/s is obtained. When the diameter of the edge 63 provided at the tip of the smooth surface 60 is 50 mm, the film pressure of the stream of thin film T is 4 μm, based on a supply of 1 liter/min of the solution L.

(3) The stream of thin film T of 4 μm is unable to remain in a state of film, due to being too thin, when passing through the edge 63 of the smooth surface 60, and is broken into pieces by the effect of a surface tension, and thus the mists M of fine particles are formed.

(4) In regard to the mists M of fine particles, the reactant gases G coming from both sides at the edge 63 are collided and the mists M become even finer particles by means of friction and vibration.

(5) The mists of fine particles are carried radially by the reactant gases G coming from both sides. Such a state is called a hollow cone. A cone angle of the hollow cone is determined in accordance with the angle of the smooth surface 60, but can also be adjusted by the jetting pressure of each reactant gas G.

Further, the reactors in accordance with alternative embodiments of the present invention are shown in FIG. 7 through FIG. 9. In the case of the reactors in these Figures, a solution L is atomized by means of an ultrasonic vibration into a state of mists M, and a component contained in the solution L is chemically changed by means of a reactant gas G. The reactor includes an ultrasonic vibrator 2 for ultrasonically vibrating the solution L to be atomized into the state of mists M, an ultrasonic power source 3, connected to the ultrasonic vibrator 2, for supplying high-frequency electric power to the ultrasonic vibrator 2 to provide for an ultrasonic vibration, and a reaction unit 31 for allowing the reactant gas G to be in contact with the mists M atomized by the ultrasonic vibrator 2. The reactor atomizes the solution L by means of the ultrasonic vibrator 2 into the state of mists M, allows the atomized mists M to be in contact with the reactant gas G, and thus the component contained in the solution L is chemically changed by means of the reactant gas G.

The illustrated reactor includes an ultrasonic atomizer 1 for atomizing the solution L by means of an ultrasonic vibration, and a collection unit 5 for chemically changing the mists M atomized by the ultrasonic atomizer 1 by means of the reactant gas G and then coagulating and collecting the mists M. The ultrasonic atomizer 1 includes a closed-structure ultrasonic atomization chamber 4 into which the solution L is fed, a plurality of ultrasonic vibrators 2 for ultrasonically vibrating the solution L in the ultrasonic atomization chamber 4 to be atomized into the mists M, a barrel 6 disposed superjacent to each ultrasonic vibrator 2, and an ultrasonic power source 3 connected to the ultrasonic vibrator 2.

In the case of the reactor in FIG. 7, the ultrasonic atomization chamber 4 and the collection unit 5 are separated and interconnected with a circulation duct 7. The reactor in FIG. 8 incorporates the ultrasonic atomization chamber 4 in the collection unit 5, and the reactor in FIG. 9 has a single air-tight chamber composed of the collection unit 5 and the ultrasonic atomization chamber 4, and the collection unit 5 is structured in integration with the ultrasonic atomization chamber 4.

These reactors allow the mists M of the solution L atomized in the ultrasonic atomization chamber 4 to flow into the closed-structure collection unit 5. The collection unit 5 collects the solution by coagulating the fine mists M and chemically changing the component contained in the solution L. Since the mists M are not in a form of gas, the mists M can be collected by coagulating without necessarily having to be cooled. However, when the mists M are to be cooled, a quicker collection is made possible.

The solution L is fed to the ultrasonic atomization chamber 4 by using a pump 10. The ultrasonic atomization chambers 4 shown in FIG. 7 through FIG. 9 respectively have a stock solution tank 11, connected via the pump 10, for storing the solution L, and the solution L continues to be fed from the stock solution tank 11. The reactor shown in FIG. 7, in particular, circulates the solution contained in the ultrasonic atomization chamber 4 to the stock solution tank 11, and continues to feed the solution L from the stock solution tank 11. However, the solution does not necessarily have to be continuously fed to the ultrasonic atomization chamber, but can also be fed in a predetermined cycle, or can be fed after the full amount of the solution has been atomized.

The solution L in the ultrasonic atomization chamber 4 is atomized into the mists M by using the ultrasonic atomizer 1. At this stage, for example, when the component contained in the solution has a tendency to transfer to a surface of the solution L, or when the component is easier to be vaporized than the solution L, the mists M atomized by using the ultrasonic atomizer 1 becomes higher than the solution L in terms of the concentration of the component. Therefore, the solution L containing a component having such a nature is atomized into the mists by using the ultrasonic atomizer 1, and then after the atomized mists M are oxidized, reduced and decomposed by means of the reactant gas G, a collection is made after coagulation, so that the component is selectively removed from the solution L in an efficient manner, and thus the removed component can be collected by chemically changing as by oxidation, reduction and decomposition.

As described above, when the component is selectively atomized from the solution L into the mists M, and the atomized component is chemically changed as by oxidation, reduction and decomposition, the whole solution L fed to the ultrasonic atomization chamber 4 does not necessarily have to be atomized into the mists M. This is because as the solution L fed to the ultrasonic atomization chamber 4 decreases by being atomized into the mists M, so the concentration of the component decreases. For this reason, in the ultrasonic atomization chamber 4, when the solution L is atomized and the concentration of the component decreases, it is possible to replenish a new solution L. In such reactor, for example, the solution is changed in a method of replacing with a new solution after a certain time course, that is, in a batch system. As indicated by arrow A in FIG. 7 as well, the solution in the ultrasonic atomization chamber 4 may also be discharged to outside without being circulated back to the stock solution tank 11.

Further, in regard to the solution L fed to the ultrasonic atomization chamber 4, the whole of the fed solution L can also be atomized into the mists M, regardless of the nature of the component contained in the solution L (for example, the component has the tendency to transfer to the surface of the solution, or is easier to be vaporized than the solution, or the like). The reactor, while continuing to feed the solution L from the stock solution tank 11 to the ultrasonic atomization chamber 4, continuously drives the ultrasonic atomizer 1, atomizes the solution into the mists M efficiently, and thus the component contained in the solution L can be chemically changed as by oxidation, reduction, and decomposition.

Further, the reactors in FIG. 7 through FIG. 9 respectively have a barrel 6 disposed in the ultrasonic atomization chamber 4 in order to be more efficient in chemically changing the component contained in the solution L by means of the reactant gas G. The barrel 6 is disposed superjacent to each ultrasonic vibrator 2, and allows the mists M to be efficiently dispersed from the solution L which is ultrasonically vibrated by the ultrasonic vibrator 2. The barrel 6 is tubular with the spraying nozzle 12 being opened at the top end. The barrel 6 is so designed that the solution L is filled inside, and an ultrasonic vibration is provided to the solution L in the barrel 6 toward the spraying nozzle 12, so that the solution L is atomized into the mists M to be dispersed from the spraying nozzle 12. The illustrated ultrasonic vibrator 2 radiates the ultrasonic wave upwardly. Therefore, the barrel 6 is disposed in a vertical posture above the ultrasonic vibrator 2. The illustrated barrel 6 is a conical horn that is tapered off toward the top end. However, the barrel can also be formed to be an exponential horn with its interior contour being exponentially curved. The barrel 6 that is a conical horn or an exponential horn carries the feature that the ultrasonic vibration can be efficiently transferred inside, so that the solution L is efficiently atomized into the mists M. However, the barrel may also be cylindrical, elliptical or polygonal.

The interior contour of the barrel 6 at its bottom opening portion is made smaller or larger than the exterior contour of the ultrasonic vibrator 2 so that the ultrasonic vibration can be transferred efficiently inside, and thus an ultrasonically vibrated liquid column P is able to rise along the interior surface. For example, the inner diameter of the lower end opening of the barrel 6 is 50-150%, preferably 60-100%, of the outer diameter of the ultrasonic vibrator 2.

Further, the height of the barrel 6 and the size of the spray opening 12 are so designed that a layer of air is not formed along the inside of the barrel 6 or, in other words, between the interior surface of the barrel 6 and the liquid column P of the solution L, and the liquid column P caused by the ultrasonic vibration rises along the inside of the barrel 6 and is dispersed, in the form of mists M, in the vicinity of the spray opening 12. Alternatively, it is also possible to arrange that the tip of liquid column P projects outside the spray opening 12 or, in other words, the barrel 6 is lower in height than is the liquid column P Thus, the height of the barrel 6 and the size of the spray opening 12 are designed to obtain optimal values in accordance with factors such as the size, output power and frequency regarding the ultrasonic vibrator 2.

The illustrated barrel 6 has its lower end disposed below the liquid surface of the solution L and its spray opening 12 is disposed above the liquid surface. The barrel 6 guides the ultrasonic vibration below the liquid surface into its inside and allows the liquid to be dispersed in the form of mists M through the spray opening 12 which is superjacent to the liquid surface.

The barrel 6 in FIG. 10 is disposed superjacently away from the ultrasonic vibrator 2, while the barrels 6 in FIG. 11 and FIG. 12 respectively have an ultrasonic vibrator 2, disposed at the bottom and has its lower end opening closed liquid-tightly by the ultrasonic vibrator 2. The barrel 6 with its lower end closed by the ultrasonic vibrator 2 has an inlet aperture 13 opened for supplying the solution L inside.

Further, the barrel 6 in FIG. 12 is divided into a plurality of branched barrels 6A. Each of the branched barrels 6A is of a conical horn tapered off toward its upper end. Each of the branched barrels 6A defines an opening at its lower end and also a spray opening 12 at its upper end. The boundary between the adjacent branched barrels 6A is tapered off toward the lower end and is formed to be sharp at its lower end edge so that the ultrasonic vibration can be efficiently conducted inside the branched barrels A by reducing reflection of the ultrasonic vibration. Each of the branched barrels 6A defines an inlet aperture 13 for allowing the solution L to be supplied inside. The solution L is supplied to the barrel 6 through the inlet aperture 13. The ultrasonic wave of ultrasonic vibration emitted from the ultrasonic vibrator 2 is branched and guided into the plurality of branched barrels 6A through the supplied solution. Inside each of the branched barrels 6A, the solution L is ultrasonically vibrated to form a liquid column and is dispersed in the form of atomized mists M from the spray opening 12 at the top.

Further, the barrel 6 has a gas nozzle 14 opened for supplying the reactant gas G to the mists M being atomized through the spray opening 12, and the gas nozzle 14 is connected to a supply source 32. The supply source 32 supplies the pressurized reactant gas G to the barrel 6. As describe previously, the reactant gas G to be used is the gas in which the component contained in the solution L is chemically reacted as by oxidation, reduction and decomposition. The supply source 32 can be of the same structure as the above-described pressure feed unit. When a reactant gas G to be fed is, for example, air that contains ozone, the supply source 32, although not shown, may include a compressor for forcibly blowing air, and an ozonizer for generating ozone in the air which is forcibly blown. The reactant gas G fed out of the supply source 32 is supplied to the mists M from the gas nozzle 14, and the mists M sprayed from the spraying nozzle 12 is atomized into the reactant gas G. The mists M thus atomized in this state are coagulated at the collection unit 5, and the solution L is collected.

The barrels 6 in FIG. 10 through FIG. 12 respectively have a double-wall structure forming a duct 15 between the planar walls. The duct 15 is connected to the gas nozzle 14 opening at the upper end of the barrel 6. The reactant gas G fed to the duct 15 is discharged through the gas nozzle 14. The gas nozzle 14 is a slit-shaped opening to surround the top end of the barrel 6. The slit-shaped gas nozzle 14 delivers the reactant gas G in a ring form. The mists M are discharged to the inside of the reactant gas G delivered in a ring form. A barrel 6 of this structure allows the mists M to be sprayed to the inside of a fresh reactant gas G. Consequently, the solution L can be atomized into the mists M efficiently to chemically change the component contained in the solution L. This is because the mists M are atomized into the reactant gas G where the mists M are less concentrated.

The barrels 6 in FIG. 10 through FIG. 12 respectively are removably connected to a connection duct 16. Although not shown, a plurality of barrels are connected to the connection duct 16. The barrel 6 in FIG. 10 has a male thread 17 provided exteriorly around its lower end, and a hole with a female thread 18 is defined in the connection duct 16 to allow the male thread 17 of the barrel 6 to be screwed in. The barrel 6 is connected to the connection duct 16 by the male thread 17 being screwed into the hole with the female thread 18. The connection duct 16 has a supply duct 19 for the reactant gas G inside. The supply source 32 for the reactant gas G is connected to the supply duct 19. When the barrel 6 is connected to the connection duct 16, an inlet aperture of the duct 15 is connected to the supply duct 19 in the connection duct 16, and the reactant gas G is supplied to the duct 15 in the barrel 6 through the supply duct 19 in the connection duct 16. The barrel 6 in FIG. 10 has an annular groove provided respectively above the male thread 17 and in the bottom face, and O-rings 20, 21 are inserted respectively in the groove. When the barrel 6 is connected to the connection duct 16, the O-rings 20, 21 serve to seal the inner face of the hole having the female thread 18 to prevent a gas leakage through the joint between the connection duct 16 and the barrel 6. That is, the barrel 6 is joined to the connection duct 16 in an airtight state.

The barrels 6 in FIG. 11 and FIG. 12 respectively have a cylindrical connecting part 22 at its lower end, and a connecting hole 23 for this connecting part 22 to be inserted into is defined in the connection duct 16. The connecting hole 23 is extended vertically through the connection duct 16. To prevent a gas leakage between the connecting part 22 and the connecting hole 23, an O-ring 20 is inserted in an annular groove provided at the upper portion of the connecting part 22, and an O-ring 21 is inserted in an annular groove provided in the lower portion of the connecting hole 23. The O-rings 20, 21 serve to seal a gap between the connecting part 22 and the connecting hole 23 and connect the barrel 6 to the connection duct 16 air-tightly so as to prevent a leakage of gas. When the barrel 6 is connected to the connection duct 16, an inlet aperture of the duct 15 in the barrel 6 is connected to a supply duct 19 in the connection duct 16, and the reactant gas G is supplied to the duct 15 in the barrel 6 through the supply duct 19 in the connection duct 16.

Further, each of these illustrated barrels 6 has an ultrasonic vibrator 2 removably connected to the barrel 6 via a removable connector 24. Provided inside the removable connector 24 is a mounting chamber 25 that opens upwardly. The ultrasonic vibrator 2 is fixed in this mounting chamber 25. The illustrated removable connector 24 also accommodates, in the mounting chamber 25, a power supply circuit component 26 for driving the ultrasonic vibrator 2. The power supply circuit component 26 is connected to the ultrasonic vibrator 2 via a lead wire 27 and outputs an ultrasonic power of electrical signal to the ultrasonic vibrator 2. The ultrasonic vibrator 2 seals the opening of the mounting chamber 25 air-tightly. Accordingly, the periphery of the ultrasonic vibrator 2 is in firm contact with the rim of the opening of the mounting chamber 25 via a gasket 28. The power supply circuit component 26 is received in the mounting chamber 25 which is sealed water-tightly by the ultrasonic vibrator 2. Because of this structure, the power supply circuit component 26 is not required to be of a watertight structure. Because the illustrated removable connector 24 incorporates the ultrasonic vibrator 2 and the power supply circuit component 26 in the mounting chamber 25, the removable connector 24 carries the advantage that the ultrasonic vibrator 2 and the power supply circuit component 26 can be replaced easily. Alternatively, however, the removable connector can be so designed that only the ultrasonic vibrator is received in the mounting chamber, and that the lead wire, connecting to the ultrasonic vibrator, can be led outside the removable connector to be connected to a power supply circuit. In such a removable connector, the ultrasonic vibrator does not necessarily have to be fixed in a manner of a watertight structure.

The removable connector 24 is removably connected to a connecting recess 29 defining an inverted opening in the lower end of the barrel 6. The removable recess 29 has a female thread provided on its inner face. The removable connector 24 is so exteriorly profiled as to be inserted into the removable recess 29 and is exteriorly threaded to be screwed into the female thread of the removable recess 29. By screwing the male thread into the female thread, the removable connector 24 is connected to the removable recess 29. Because the removable recess 29 is communicated with the inside of the barrel 6, the removable connector 24 must be connected to the barrel 6 in a manner of liquid-tight structure.

For this purpose, the O-ring 30 is interposed between the inner circumference of the removable recess 29 and the outer circumference of the removable connector 24. Owing to the O-ring 30 being liquid-tightly connected to the removable connector 24, the removable recess 29 in the lower end of the barrel 6 is sealed liquid-tightly by the removable connector 24.

In the ultrasonic atomizer 1 as described above, the ultrasonic vibrator 2 is ultrasonically vibrated and the solution L is dispersed through the spray opening 12 of the barrel 6 in the form of mists M. The solution L is dispersed in the form of mists M from the spray opening 12 by being ultrasonically vibrated within the barrel 6. In the illustrated ultrasonic atomizer 1, the ultrasonic vibrator 2 is disposed to face upwardly. The ultrasonic vibrator 2 radiates an ultrasonic wave upwardly from the bottom toward the inside of the barrel 6, ultrasonically vibrates the solution L, and pushes up the solution L, inside the barrel 6, to be dispersed in the form of mists M through the spray opening 12. The ultrasonic vibrator 2 emits the ultrasonic wave in a vertical direction.

The ultrasonic atomizers 1 shown in FIG. 7 through FIG. 9 respectively include a plurality of ultrasonic vibrators 2 and ultrasonic electric power sources 3, the power sources 3 causing these ultrasonic vibrators 2 to be ultrasonically vibrated. The ultrasonic vibrator 2 is fixed subjacently to the barrel 6.

The mists M of the solution L atomized in the ultrasonic atomization chamber 4 are allowed to flow into the collection unit 5 after chemically changing the component contained in the solution L by means of the reactant gas G. To allow the mists M to flow into the collection unit 5, in the reactor shown in FIG. 7, the collection unit 5 is connected to the ultrasonic atomization chamber 4 via the circulating duct 7; in the reactor shown in FIG. 8, the ultrasonic atomization chamber 4 is built in the collection unit 5; and in the reactor shown in FIG. 9, the ultrasonic atomization chamber 4 is disposed on the top of the collection unit 5. In the reactor shown in FIG. 8 and FIG. 9, the volume of the collection unit 5 is set to be sufficiently large as compared with the volume of the ultrasonic atomization chamber 4, for example, being set to be 2 to 100 times or preferably 5 to 50 times or even more preferably 5 to 20 times the volume of the ultrasonic atomization chamber 4. In the reactor shown in FIG. 8, the ultrasonic atomization chamber 4 and the upper part of the collection unit 5 are integrally structured by being connected via a duct 8 which constitutes a communication passage. The mists M atomized in the ultrasonic atomization chamber 4 fall slowly and are collected, as a solution L, in the collection unit 5.

Further, in the reactor shown in FIG. 7, to collect the mists M, dispersed from the spray opening 12 of the barrel 6, to be circulated through the circulation duct 7 efficiently, an intake 9 of the mists M is provided above the spray opening 12 of the barrel 6. The illustrated intake 9 is a cylindrical pipe and is disposed in a vertical orientation above the barrel 6. The intake 9 being a cylindrical pipe has its lower end disposed above the barrel 6, and the upper end is extended upwardly in the ultrasonic atomization chamber 4. In the illustrated intake 9, the lower end edge of the cylindrical pipe is positioned at the upper end edge of the barrel 6. Alternatively, however, the intake may have its lower end part disposed to lap over the upper end of the barrel or its lower end edge disposed away from the upper end edge of the barrel. Further, the opening in the lower end of the intake 9 is of a larger opening area than the spray opening 12 of the barrel 6, so that all of the mists M dispersed from the upper end of the barrel 6 can be fully collected. The upper end of the intake 9 is connected to the top of the ultrasonic atomization chamber 4 and such connection is linked to the circulation duct 7, so that the mists M collected by the intake 9 are circulated to the circulation duct 7. However, the intake does not necessarily have to be provided.

The reactor in FIG. 7 is able to incorporate a cooling heat exchanger, although not shown, for coagulating the mists in the collection unit. The cooling heat-exchanger is structured to have fins fixed to a heat-exchanger pipe, in which a coolant or cooling water is circulated through the heat-exchanger pipe, and thus the collected mists can be cooled and coagulated. Although some of the mists atomized in the ultrasonic atomization chamber is vaporized to become a gas, the gas in this reactor is cooled by the cooling heat-exchanger of the collection unit and is coagulated after agglomeration. The mists flowing into the collection unit collide with the cooling heat-exchanger or collide with one another to become coagulated into larger pieces, or collide with the fins and others in the cooling heat-exchanger to become coagulated into larger pieces, thus being collected in the form of the solution. After the mists and the gas are coagulated by the cooling heat-exchanger and collected, the reactant gas having chemically changed the component contained in the solution L is forcibly inhaled and collected by the pump, or is fed back again to the pressure feed unit, or is discharged into the air.

The collection unit 5 shown in FIG. 8 and FIG. 9 is of a closed chamber, and the mists M supplied to the chamber are not released to outside. Therefore, the mists M supplied to the collection unit 5 collide with one another to be condensed into larger dew, or collide with a baffle plate and others to be condensed into larger dew, and are collected as a solution L. To collect the mists M more rapidly in the collection unit 5, the collection unit 5 shown in FIG. 8 and FIG. 9 has a nozzle 36 for spraying the solution L having the component chemically changed. The nozzle 36 is connected to the bottom of the collection unit 5 via a circulation pump 35. The circulation pump 35 takes in the solution L collected in the collection unit 5, so that the solution L is sprayed from the nozzle 36.

In the illustrated reactor, the nozzles 36 are disposed at the top and at the sides of the collection unit 5. The nozzles 36 at the top spray the solution L downwardly. The nozzles 36 at the sides spray the solution L horizontally. The solution L sprayed from the nozzles 36 is in droplets amply larger than the mists M atomized in the ultrasonic atomizer 1 and falls rapidly inside the collection unit 5, and as the droplets fall, they collide with the mists M floating inside the collection unit 5 and collects the mists M while falling. Therefore, the mists M floating in the collection unit 5 can be collected rapidly with good efficiency.

Although the illustrated reactor has the nozzles 36 disposed at the upper portion and at the lateral portions of the collection unit 5, the nozzles may also be disposed at the bottom portion of the collection unit 5. The nozzles at the bottom spray the solution L upwardly. The nozzle sprays the solution at such a speed that the solution hits the ceiling of the collection unit, or at such a speed that the solution ascends to the proximity of the ceiling. Because the solution sprayed so as to ascend to the proximity of the ceiling turns its direction to a downward orientation in the proximity of the ceiling and falls, the solution comes in contact with the mists M while the solution rises and falls, and thus the mists M can be collected effectively.

Further, in the reactors shown in FIG. 8 and FIG. 9, the reactant gas which has been sprayed from the gas nozzle 14 and has chemically changed the component contained in the solution L is collected from the collection unit 5. These illustrated reactants forcibly inhale and collect the reactant gas which has chemically changed the component contained in the solution L, by using the pump connected to the upper portion of the collector unit 5. The collected gas is fed back again to the pressure feed unit, or is discharged into the air. However, the gas collected from the collection unit 5 may involve a risk of containing the atomized mists M. Therefore, the reactor may be provided, in a gas outlet 34 of the collection unit 5, with a filter (not shown) of such a pore size as allows the gas to pass through but does not allow the solution such as the mists to pass through, so that the mists are prevented from passing through the filter. Further, the reactor, although not shown, can also feed the gas, collected from the collection unit, to a second collection unit, so that the mists contained in the collected gas can be coagulated and collected in the second collection unit. The above-described cooling heat-exchanger or the like can be used in the second collection unit.

Further, a plurality of baffle plates 37 are disposed inside the collection unit 5 shown in FIG. 13. The baffle plates 37 are disposed in a vertical orientation, with adjacent baffle plates being spaced apart from each other to allow the mists M to pass through. The vertically disposed baffle plate 37 is so designed that the mists M are collided against and attached to the surface of the baffle plate so that the solution L may spontaneously flow downwardly to be collected. The illustrated baffle plate 37 has an uneven or rugged surface so that the mists M may be in better contact with the surface to be collected more efficiently.

Further, the collection unit 5 in FIG. 13 is provided with a fan 38 for forcibly blowing and agitating the mists M. The fan 38 is intended to agitate the mists M within the collection unit 5. The mists thus agitated collide with one another and are condensed, or collide with the surface of the baffle plate 37, and thus the mists are condensed. Such condensed mists M rapidly fall downwardly and are collected. The illustrated fan 38 is so designed as to blow the mists M downwardly for circulation within the collection unit 5.

In the reactor shown in FIG. 14, the collection unit 5 is provided with a vibrator 39 of the mists M for improving the probability of the mists colliding with one another through vibration of the mists M. The vibrator 39 of the mists M includes an electrical-to-mechanical oscillation converter for vibrating the gas in the collection unit 5, and an electric vibration source for driving the electrical-to-mechanical oscillation converter. The electrical-to-mechanical oscillation converter is exemplified by a device such as a loud speaker for emitting a sound at an audible frequency or an ultrasonic vibrator for emitting an ultrasonic wave ranging higher than the audible frequency. In order to efficiently vibrate the mists M, the electrical-to-mechanical oscillation converter resonates, in the collection unit 5, the vibration emitted from the electrical-to-mechanical oscillation converter. To accomplish such operation, the electrical-to-mechanical oscillation converter performs the vibration at such a frequency as may resonate in the collection unit 5. In other words, the collection unit 5 is so designed as to resonate with the vibration emitted from the electrical-to-mechanical oscillation converter.

Since the ultrasonic wave is a frequency ranging higher than a frequency audible to the human, the ultrasonic sound is not audible. For this reason, the vibrator 39 of the mists M for emitting the ultrasonic wave is sonically harmless to the human when the gas is vehemently vibrated in the collection unit 5, that is, when the output from the electrical-to-mechanical oscillation converter is extremely increased. As such, the ultrasonic wave carries the advantage that the mists M can be vehemently vibrated by the ultrasonic wave and efficiently collided with one another for a rapid collection.

Since the above-described reactor is so constructed and arranged that a device for condensing the mists M efficiently is disposed in the collection unit 5, the mists M can be condensed into a highly concentrated solution L more rapidly. Further, although not illustrated, the inventive reactor can have a nozzle for spraying the solution, a fan for agitating the mists, and a vibrator for vibrating the mists, in a full set incorporated inside the collection unit, so that the mists can be condensed with the highest efficiency. Alternatively, two units of such devices for condensing the mists may be incorporated to condense the mists efficiently.

Industrial Applicability

The present invention is applicable for a variety of reactors and reaction methods for chemically reacting the reactant gas with the component contained in the solution. In particular, the invention can be advantageously used for a reactor and reaction method for oxidizing or reducing to decompose an organic substance contained in a solution such as a waste liquid.

DESCRIPTION OF THE NUMERAL REFERENCES

Figure 1:
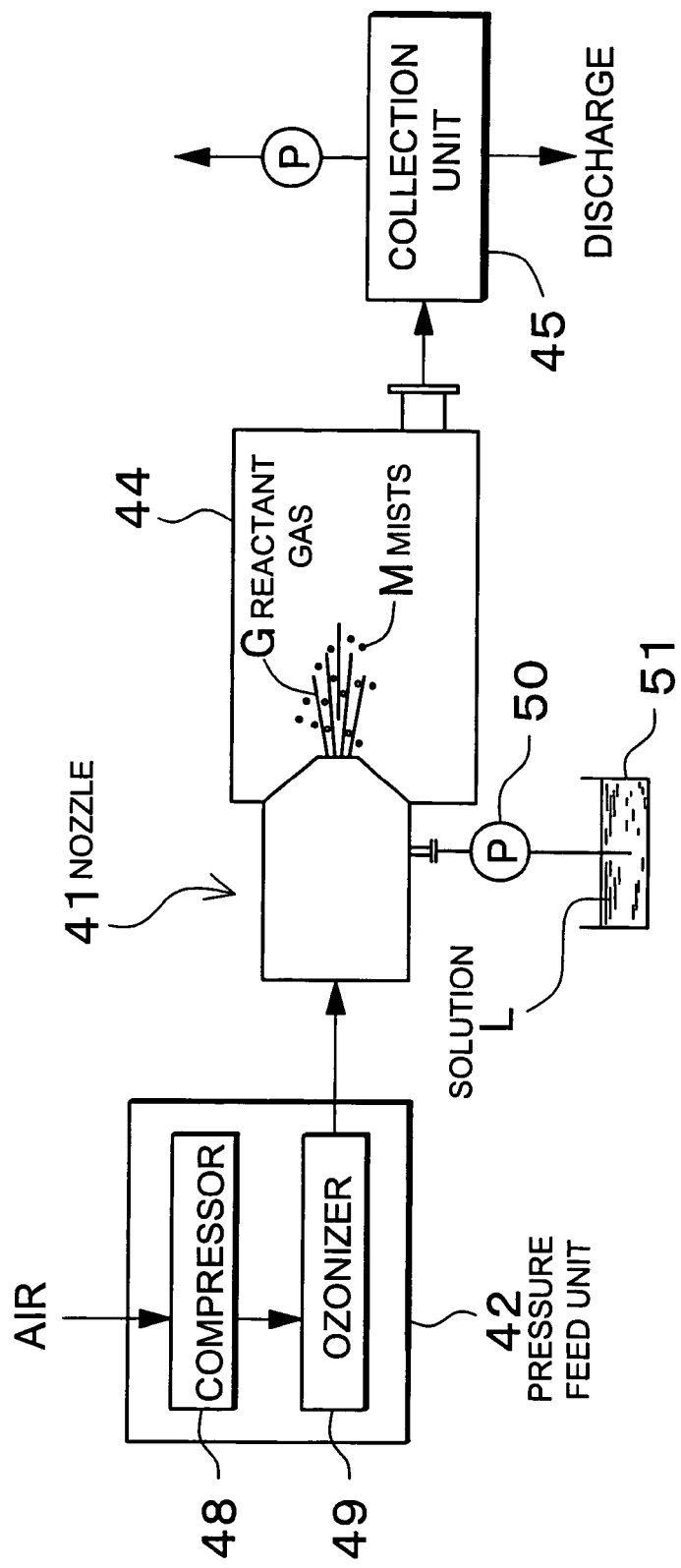
FIG. 1 is a block schematic diagram of the solution reactor in accordance with an embodiment of the present invention.
Figure 2:
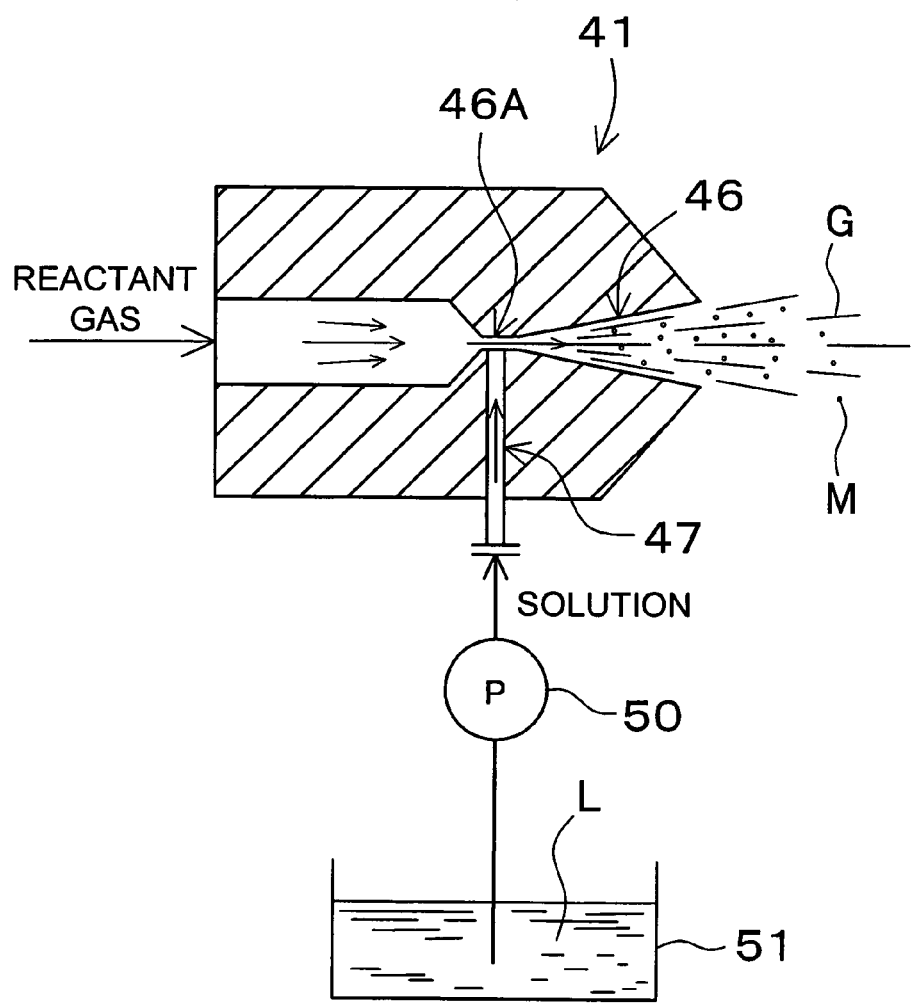
FIG. 2 is an enlarged cross-sectional view of the nozzle used in the solution reactor shown in FIG. 1.
Figure 3:
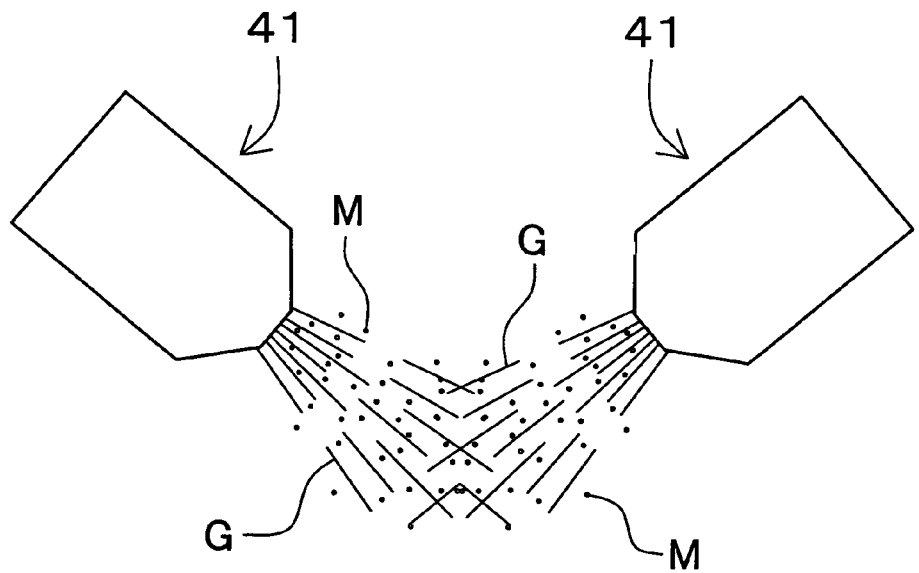
FIG. 3 is a front view showing another example of the nozzle.
Figure 4:
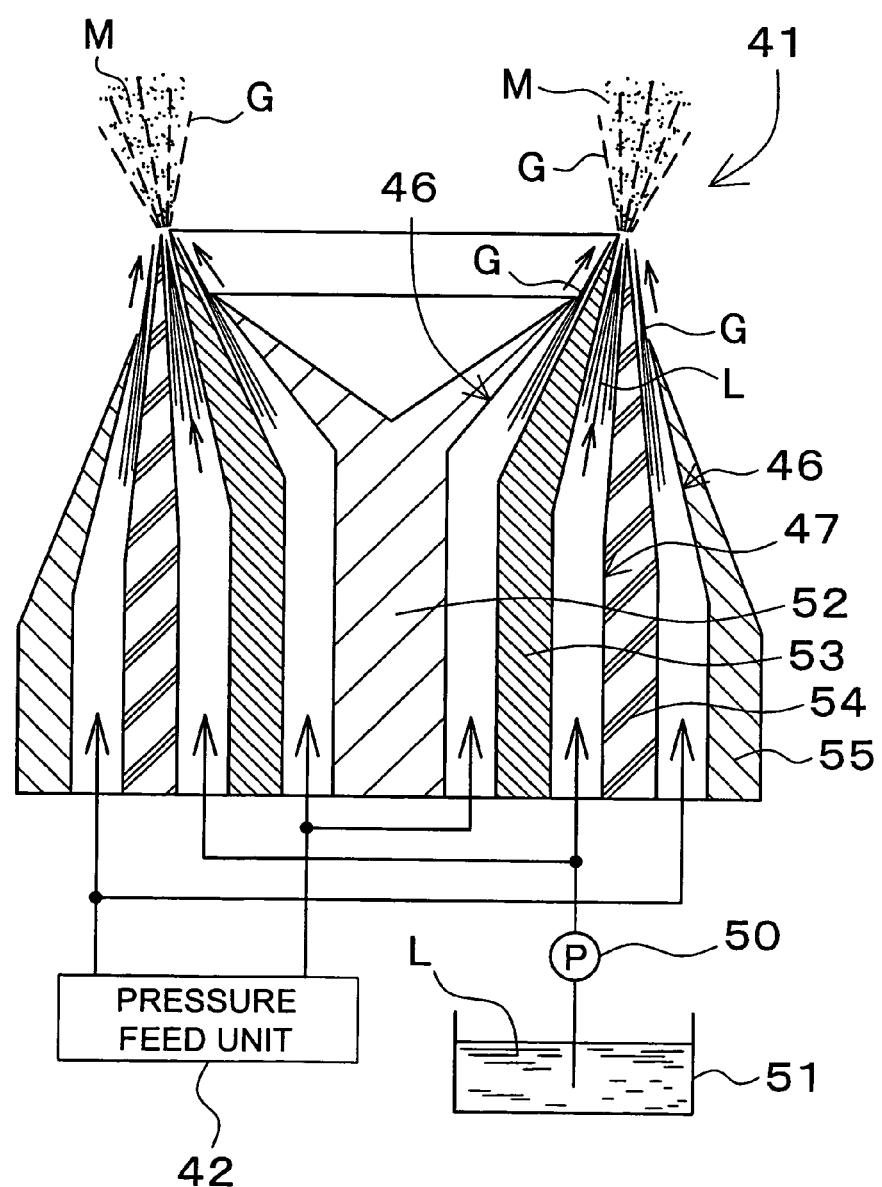
FIG. 4 is an enlarged cross-sectional view showing another example of the nozzle.
Figure 5:
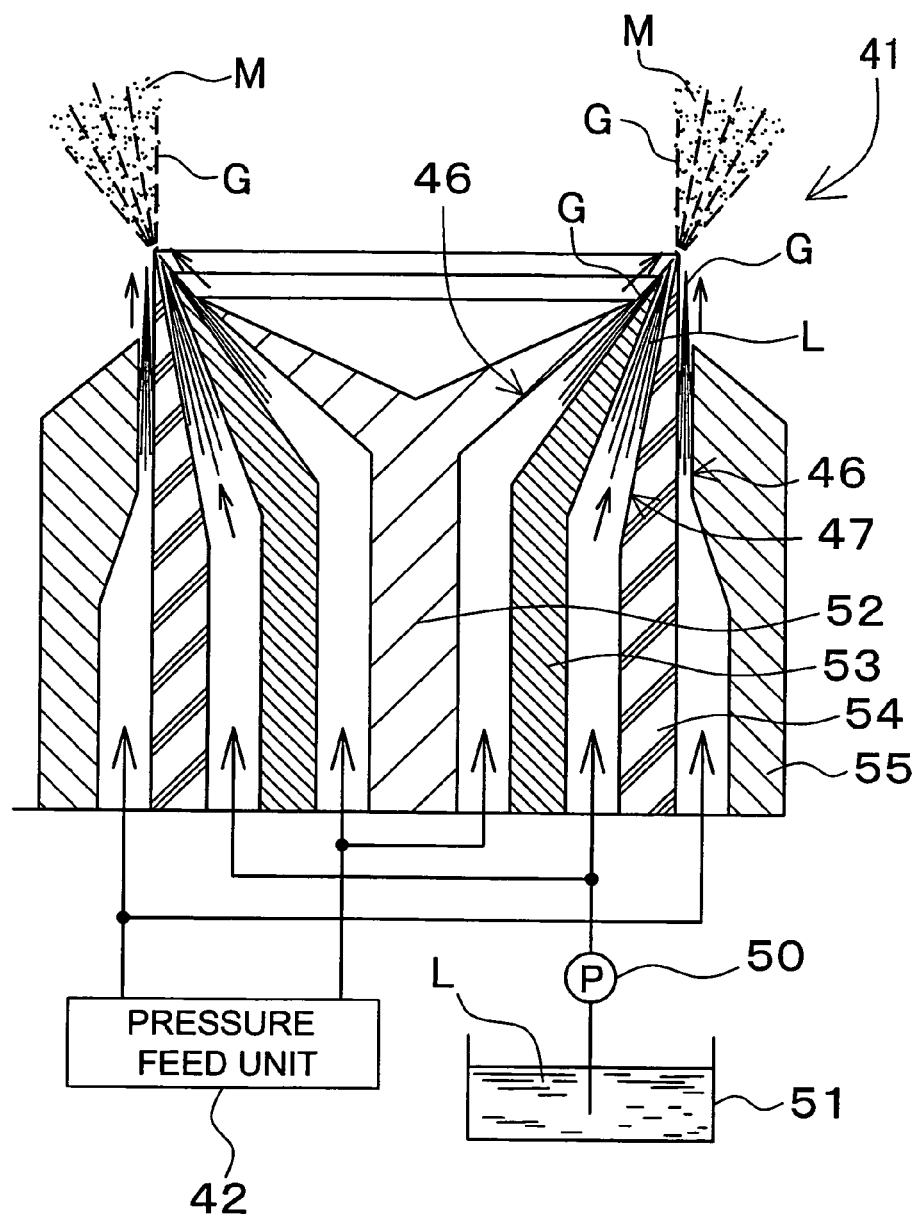
FIG. 5 is an enlarged cross-sectional view showing yet another example of the nozzle.
Figure 6:
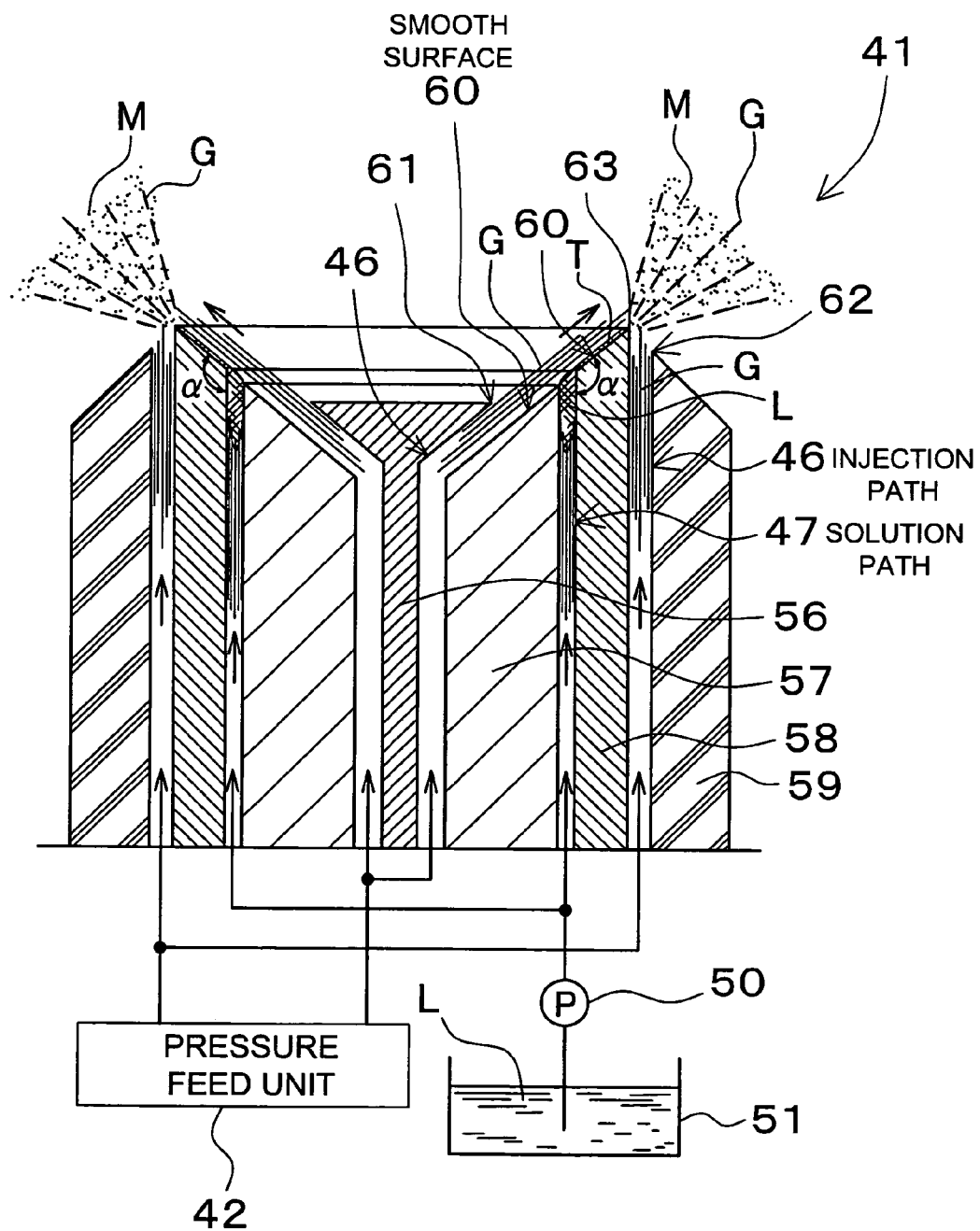
FIG. 6 is an enlarged cross-sectional view of a further example of the nozzle.
Figure 7:
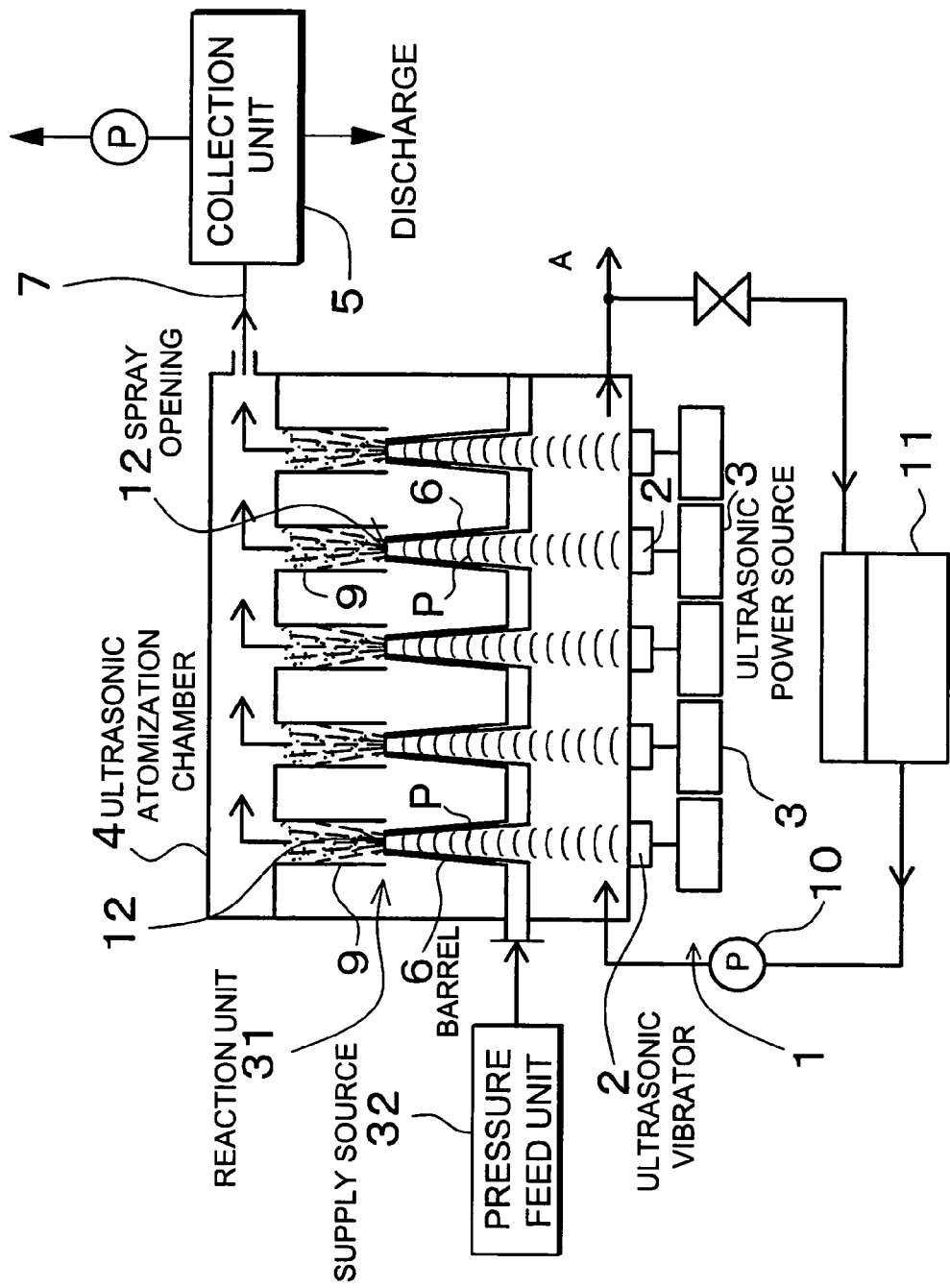
FIG. 7 is a block schematic diagram of the solution reactor in accordance with another embodiment of the invention.
Figure 8:
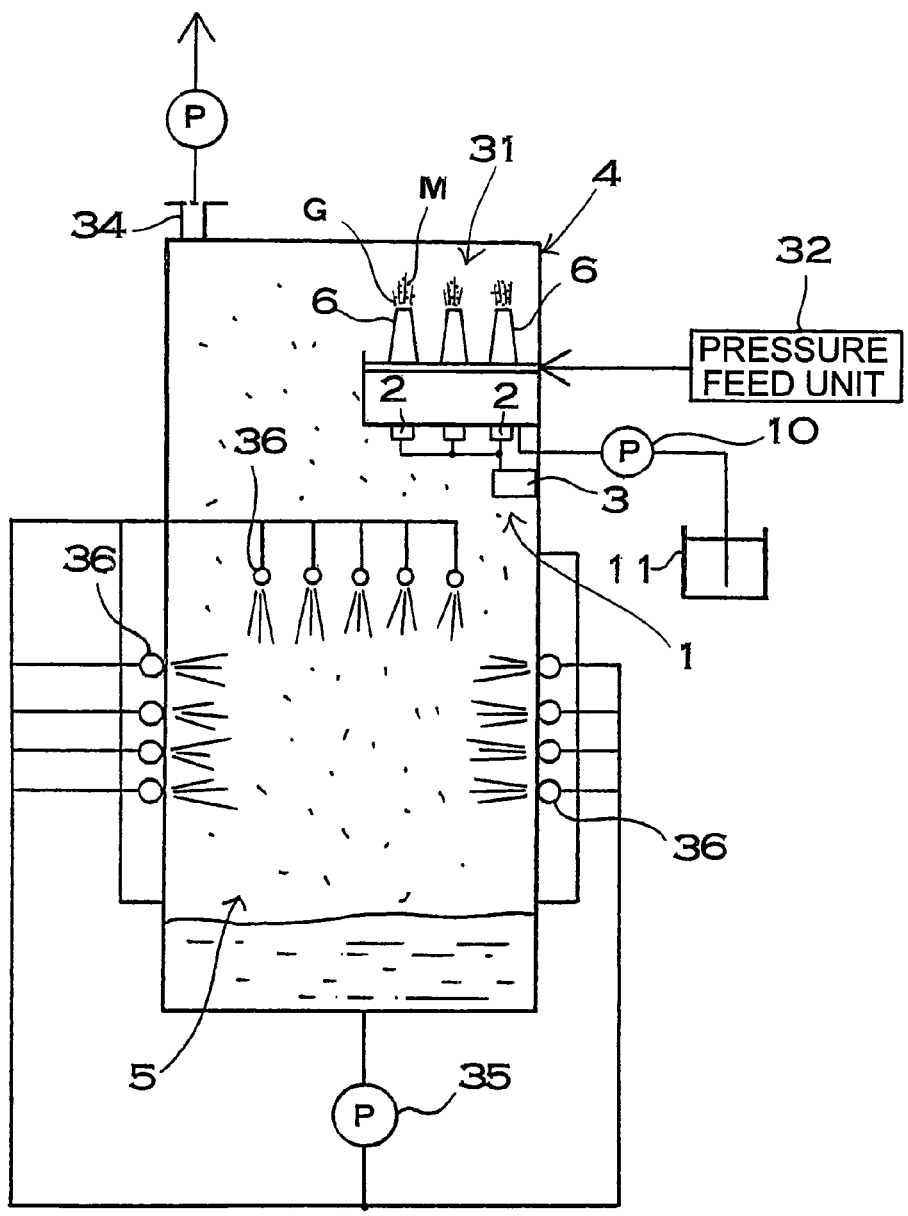
FIG. 8 is a block schematic diagram of the solution reactor in accordance with even another embodiment of the invention.
Figure 9:
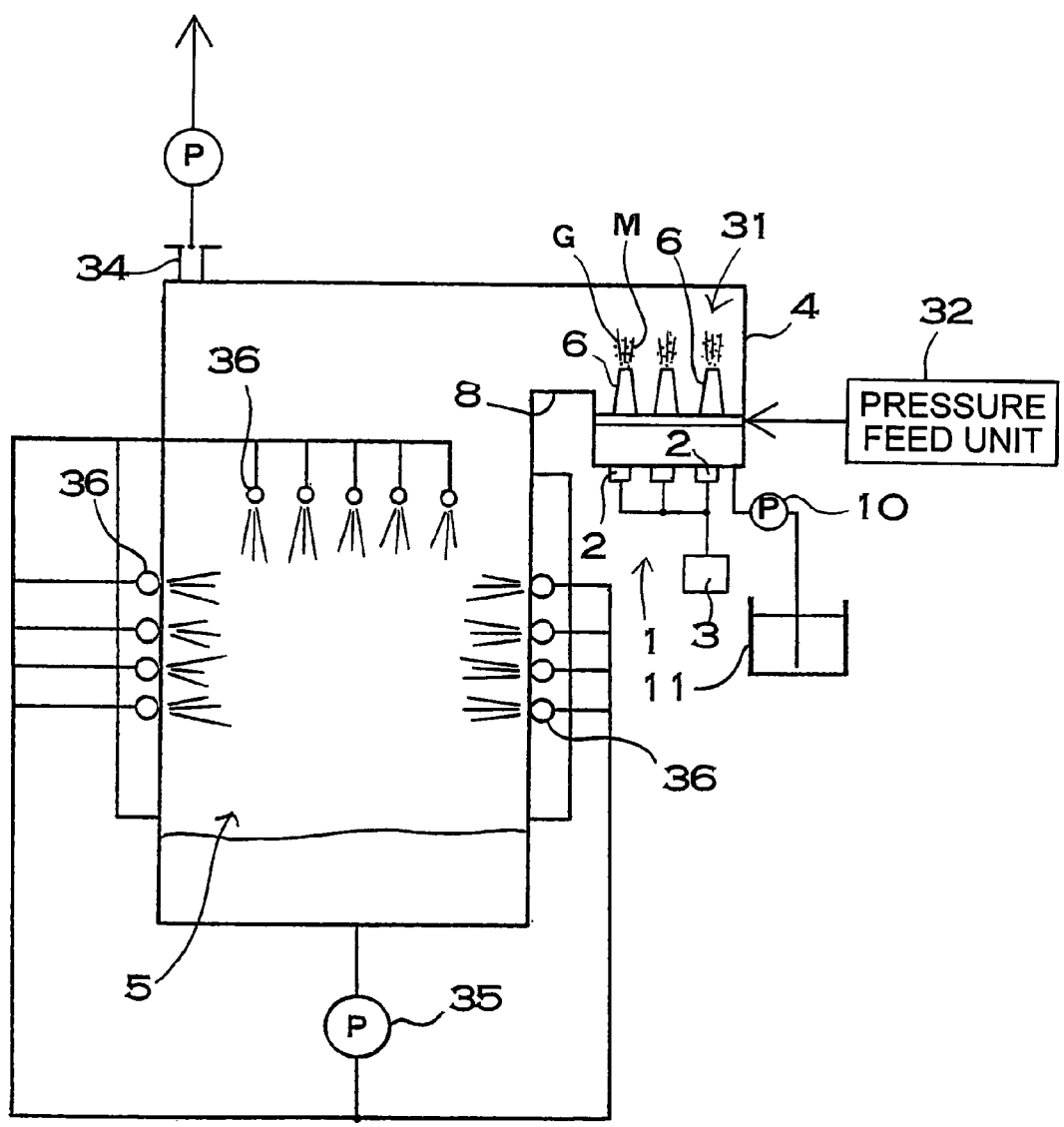
FIG. 9 is a block schematic diagram of the solution reactor in accordance with a further embodiment of the invention.
Figure 10:
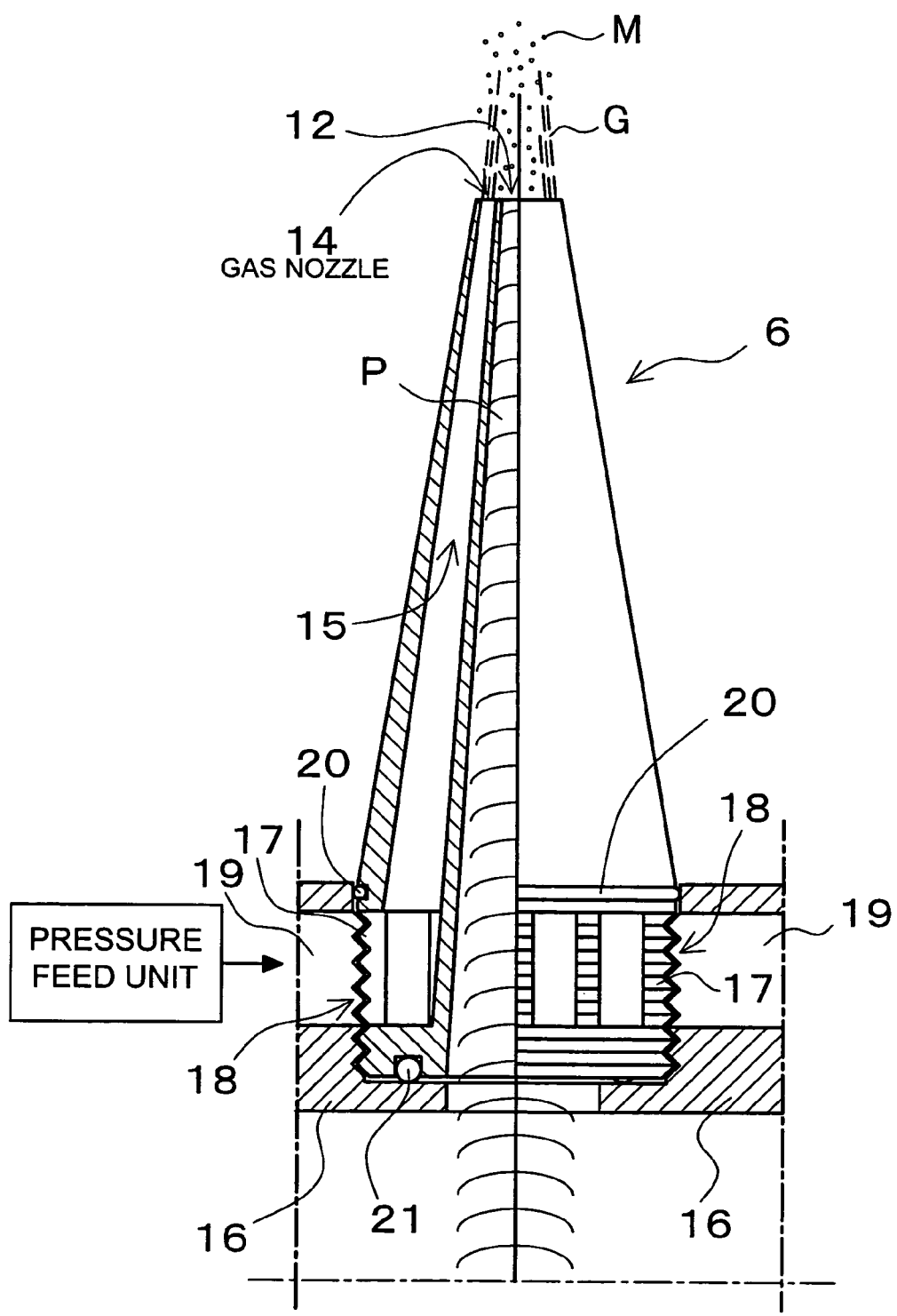
FIG. 10 is an enlarged, front cross-sectional view showing the barrel used in the solution reactor shown in FIG. 9.
Figure 11:
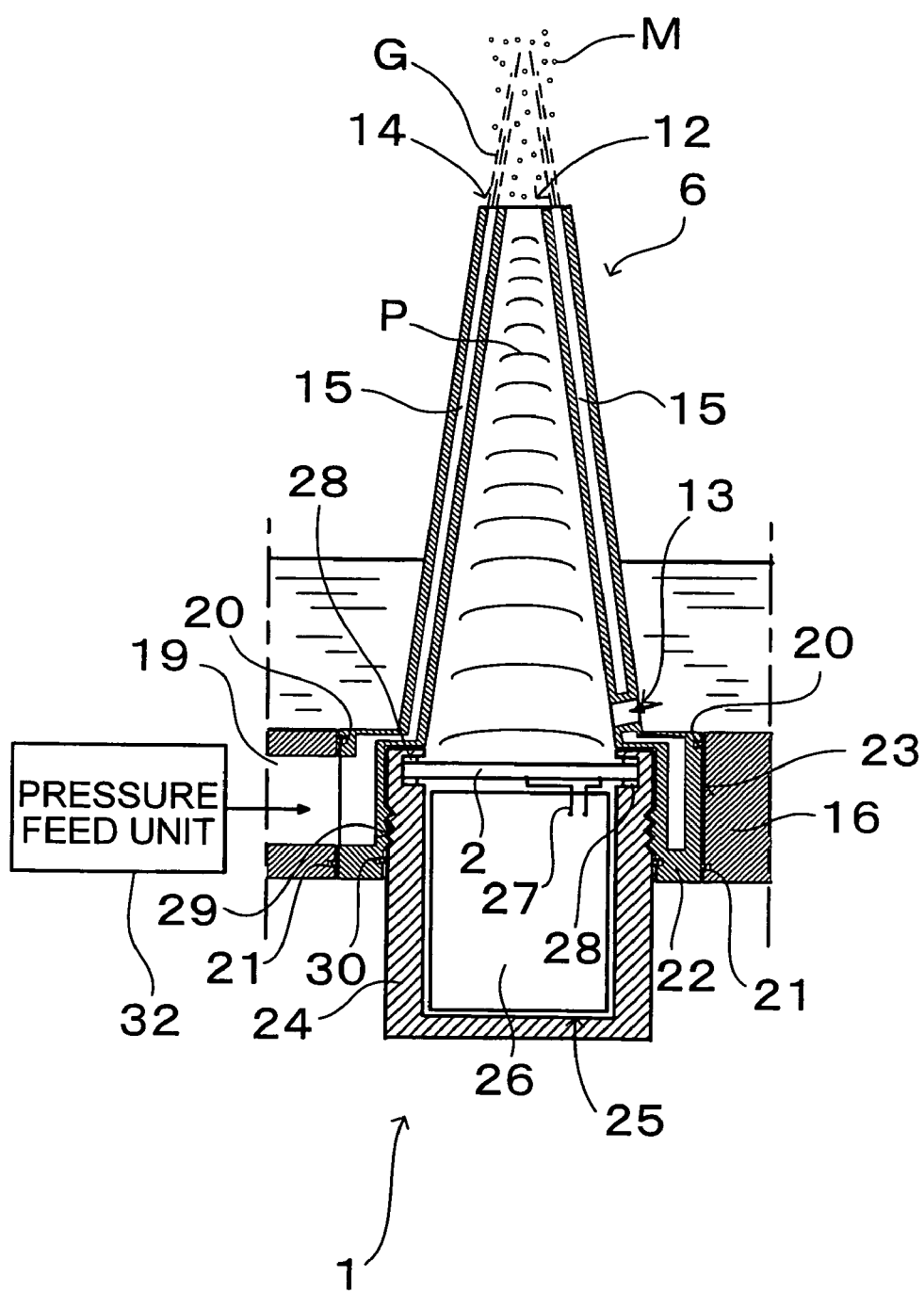
FIG. 11 is an enlarged cross-sectional view showing another example of the barrel.
Figure 12:
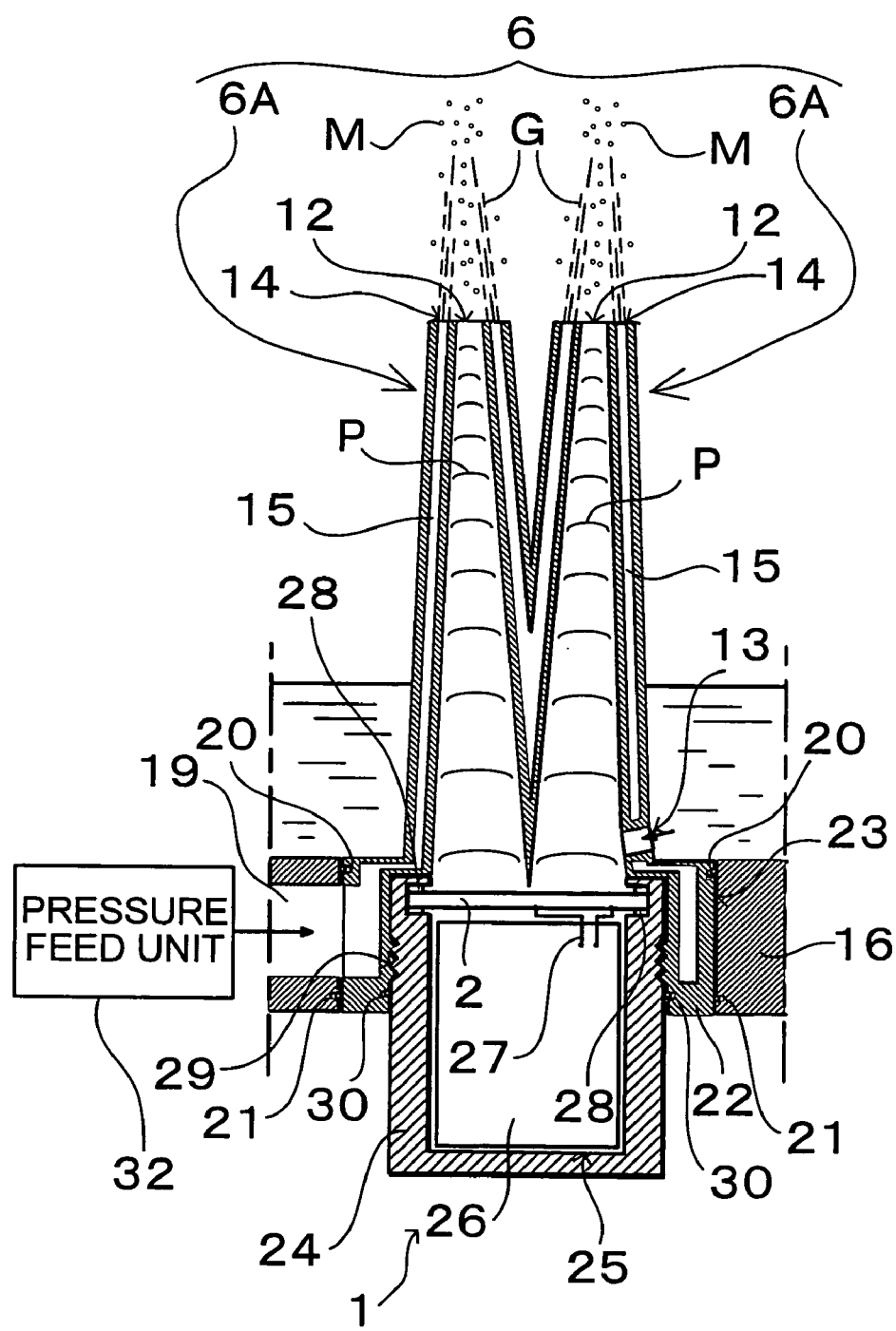
FIG. 12 is an enlarged cross-sectional view showing yet another example of the barrel.
Figure 13:
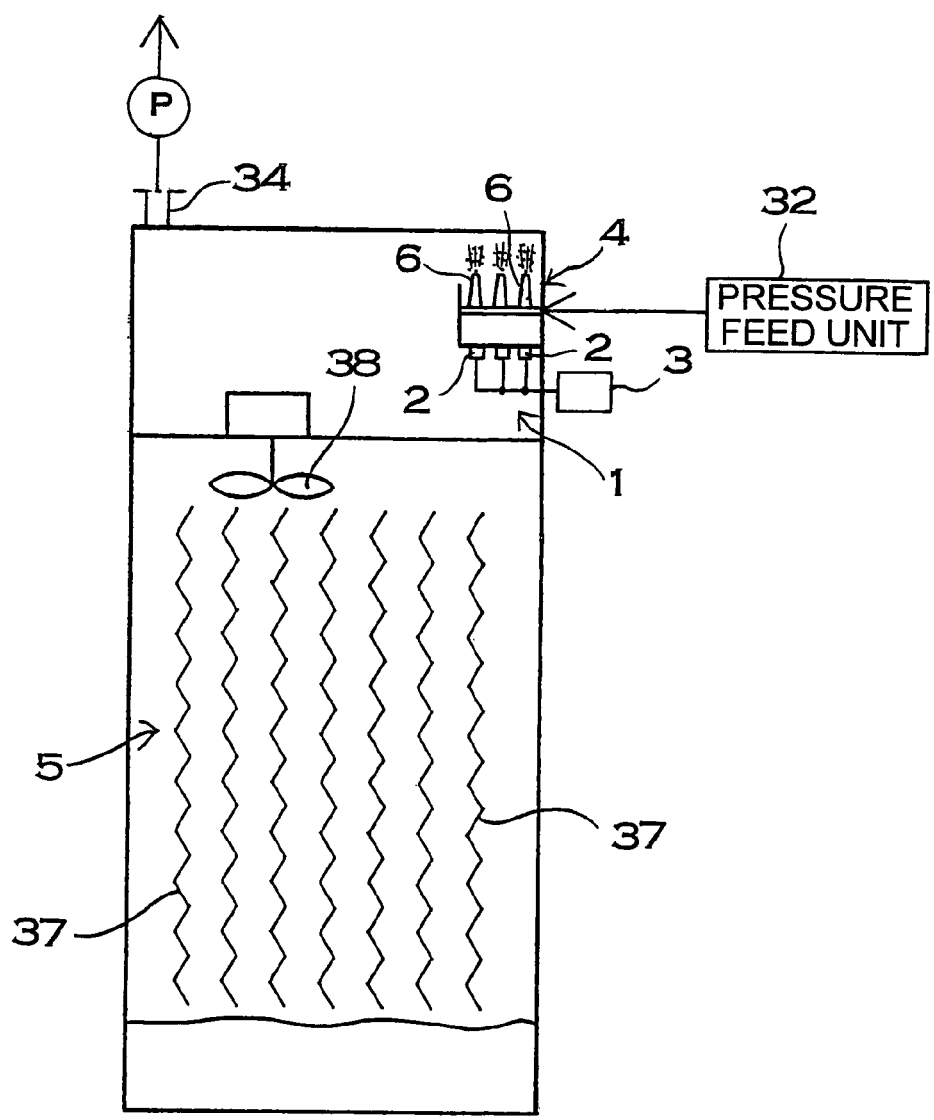
FIG. 13 is a block schematic diagram of the solution reactor in accordance with another embodiment of the invention.
Figure 14:
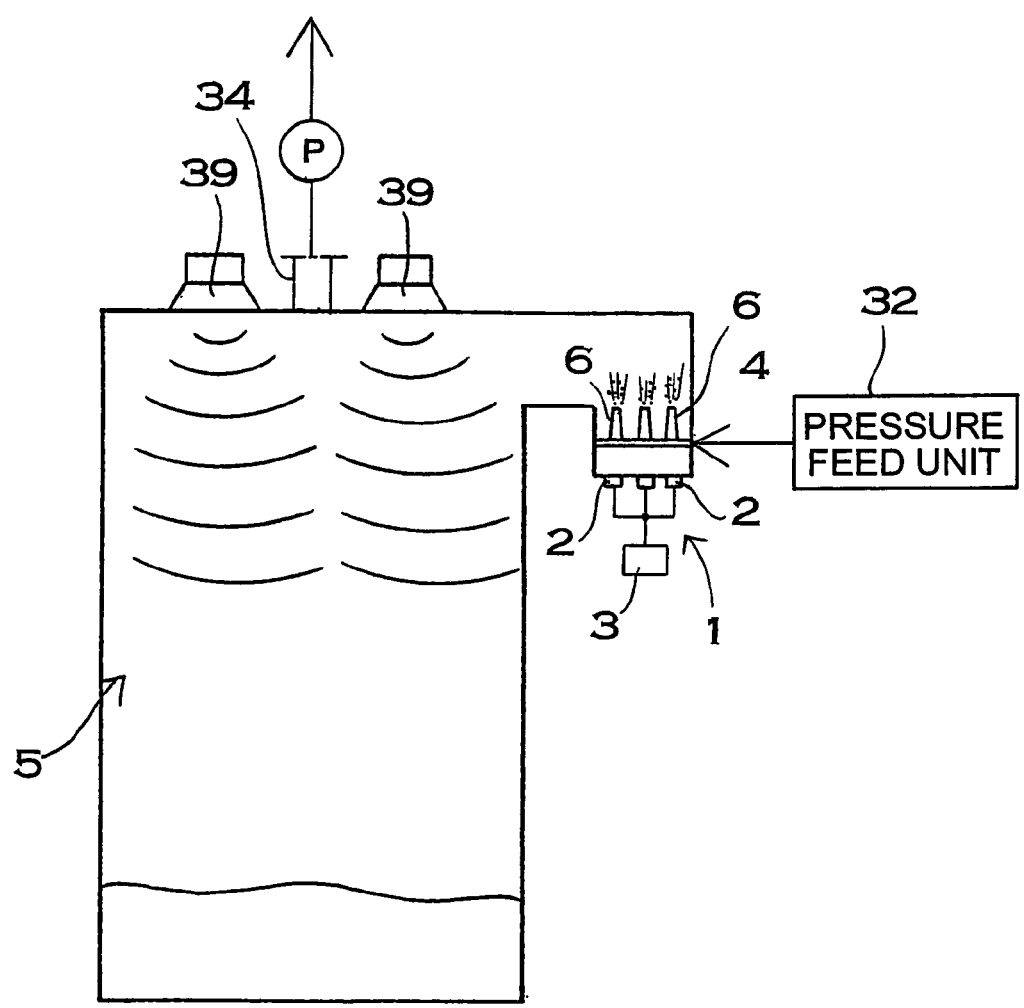
FIG. 14 is a block schematic diagram of the solution reactor in accordance with a further embodiment of the invention.

1 . . . Ultrasonic Atomizer
2 . . . Ultrasonic Vibrator
3 . . . Ultrasonic Power Source
4 . . . Ultrasonic Atomization Chamber
5 . . . Collection Unit
6 . . . Barrel
6A . . . Branched Barrel
7 . . . Circulation Duct
8 . . . Duct
9 . . . Intake
10 . . . Pump
11 . . . Stock Solution Tank
12 . . . Spray Opening 13 ... Inlet Aperture
14 ... Gas Nozzle
15 ... Duct
16 ... Connection Duct
17 ... Male Thread
18 ... Hole with Female Thread
19 ... Supply Duct
20 ... O-ring
21 ... O-ring
22 ... Connecting Part
23 ... Connecting Hole
24 ... Removable Connector
25 ... Mounting Chamber
26 ... power supply circuit component
27 ... Lead Wire
28 ... Gasket
29 ... Connecting Recess (Removable Recess)
30 ... O-ring
31 ... Reaction Unit
32 ... Supply Source
33 ... nil
34 ... Gas Outlet
35 ... Circulation Pump
36 ... Nozzle
37 ... Baffle Plate
38 ... Fan
39 ... Vibrator of Mists
40 ... nil
41 ... Nozzle
42 ... Pressure Feed Unit
43 ... nil
44 ... Reaction Chamber
45 ... Collection Unit
46 ... Injection Path
46A ... Venturi portion
47 ... Solution Path
48 ... Compressor
49 ... Ozonizer
50 ... Pump
51 ... Stock Solution Tank
52 ... Center Pole
53 ... First Ring
54 ... Second Ring
55 ... Third Ring
56 ... Center Pole
57 ... Inner Ring
58 ... Middle Ring
59 ... Outer Ring
60 ... Smooth Surface
61 ... Jet Orifice
62 ... Jet Orifice
63 ... Edge
P ... Liquid Column
L ... Solution
G ... Reactant Gas
M ... Mists
T ... Stream of Thin Film

The invention claimed is:

1. A method for solution reaction which allows a solution to contact with a reactant gas so as to chemically change a component contained in the solution by means of the reactant gas, the method comprising:
feeding the reactant gas which is pressurized into a nozzle for spraying the solution in a state of mists; and
allowing the reactant gas to flow fast by means of the nozzle, such fast flowing reactant gas being allowed to contact with the solution, the solution being broken into the mists to be jetted out of the nozzle, whereby the component contained in the solution in the state of mists is chemically changed by the reactant gas.

2. The method for solution reaction as recited in claim 1, wherein the nozzle allows the pressurized reactant gas to be jetted to an injection path; the solution is fed to the injection path; and thus the solution is atomized into the mists by means of the reactant gas.

3. The method for solution reaction as recited in claim 2, wherein the nozzle allows the fed solution to flow along a smooth surface; the reactant gas is jetted in a flowing direction of the solution; the solution flowing along the smooth surface is stretched in the flowing direction by means the reactant gas jetted along the smooth surface; and thus the mists are sprayed from a tip of the smooth surface.

4. A solution reactor for allowing a solution to contact with a reactant gas so as to chemically change a component contained in the solution by means of the reactant gas, the solution reactor comprising:
an ultrasonic vibrator for ultrasonically vibrating the solution to be atomized into a state of mists in an ultrasonic atomization chamber;
an ultrasonic power source, connected to the ultrasonic vibrator, for supplying high-frequency electric power to the ultrasonic vibrator to provide an ultrasonic vibration;
a reaction unit for allowing the reactant gas to contact with the mists which are atomized by the ultrasonic vibrator;
a barrel defining a spray opening at a top end thereof, the barrel being disposed superjacent to the ultrasonic vibrator, wherein the ultrasonic vibrator provides an ultrasonic vibration to the solution toward the spray opening of the barrel so that the solution, atomized into a form of the mists, is discharged from the spray opening; and
a connection duct which is connected to a supply source for the reactant gas at a bottom portion of the barrel,
wherein the solution is atomized by the ultrasonic vibrator into the mists, and such atomized mists are allowed to contact with the reactant gas, whereby a component contained in the solution in the state of mists is chemically changed by means of the reactant gas,
wherein the barrel defines a gas nozzle opened for feeding the reactant gas to the mists sprayed from the spray opening, the gas nozzle is connected to the supply source of the reactant gas, the reactant gas fed out of the supply source is fed from the gas nozzle to the mists, the mists sprayed from the spray opening are fed into the reactant gas, whereby the atomized mists are allowed to contact with the reactant gas, and
wherein the barrel is removably connected to the connection duct and supplied with the reactant gas through the connection duct when the barrel is connected to the connection duct.

5. The solution reactor as recited in claim 4, wherein the barrel is cylindrical.

6. The solution reactor as recited in claim 4, wherein the barrel is of a conical horn that is tapered off toward the spray opening.

7. The solution reactor as recited in claim 4, wherein the barrel is of an exponential horn.

8. The solution reactor as recited in claim 4, wherein the gas nozzle is opened to circumferentially surround the spray opening.

9. The solution reactor as recited in claim 4, wherein the reactant gas is air that contains the ozone and the solution contains an organic matter that is oxidatively decomposed in contact with ozone.

10. A method for solution reaction which allows a solution to contact with a reactant gas so as to chemically change a component contained in the solution by means of the reactant gas, the method comprising:
 ultrasonically vibrating the solution to be atomized in a state of mists;
 discharging such atomized mists inside of the reactant gas in a ring form; and
 allowing the reactant gas to contact with such atomized mists, whereby the component contained in the solution in the state of mists is chemically changed by means of the reactant gas.

11. The method for solution reaction as recited in claim 10, wherein the solution is filled in a barrel defining a spray opening opened at a top end thereof; an ultrasonic vibration is provided to the solution within the barrel toward the spray opening; the solution is atomized into the state of the mists; such mists are discharged from a spraying nozzle; the reactant gas is fed to the mists sprayed from the spray opening, whereby the mists sprayed from the spray opening are allowed to contact with the reactant gas.

12. The solution reactor as recited in claim 4, wherein the collection unit is separated from and interconnected to the ultrasonic atomization chamber through a circulation duct.

13. The solution reactor as recited in claim 4, wherein the collection unit is incorporated into the ultrasonic atomization chamber.

14. The solution reactor as recited in claim 4, wherein the collection unit and the ultrasonic atomization chamber are formed as an air-tight chamber.

15. A solution reactor for allowing a solution to contact with a reactant gas so as to chemically change a component contained in the solution by means of the reactant gas, the solution reactor comprising:
 an ultrasonic vibrator for ultrasonically vibrating the solution to be atomized into a state of mists in an ultrasonic atomization chamber;
 an ultrasonic power source, connected to the ultrasonic vibrator, for supplying high-frequency electric power to the ultrasonic vibrator to provide an ultrasonic vibration;
 a reaction unit for allowing the reactant gas to contact with the mists (M) which are atomized by the ultrasonic vibrator;
 a barrel defining a spray opening at a top end thereof, the barrel being disposed superjacent to the ultrasonic vibrator, wherein the ultrasonic vibrator provides an ultrasonic vibration to the solution toward the spray opening of the barrel so that the solution, atomized into a form of the mists, is discharged from the spray opening; and wherein the solution is atomized by the ultrasonic vibrator into the mists, and such atomized mists are allowed to contact with the reactant gas, whereby a component contained in the solution in the state of mists is chemically changed by means of the reactant gas, wherein the barrel defines a gas nozzle opened for feeding the reactant gas to the mists sprayed from the spray opening, the gas nozzle is connected to a supply source of the reactant gas, the reactant gas fed out of the supply source is fed from the gas nozzle to the mists, the mists sprayed from the spray opening are fed into the reactant gas, whereby the atomized mists are allowed to contact with the reactant gas, wherein the barrel defines a connecting recess forming an inverted opening at the lower end of the barrel, wherein the barrel comprises a removable connector which is connected at the connecting recess in the removable fashion, and wherein the removable connector comprises a mounting chamber opening upwardly therein, and the ultrasonic vibrator is fixed in the mounting chamber.

16. The solution reactor as recited in claim 15, wherein the barrel is cylindrical.

17. The solution reactor as recited in claim 15, wherein the barrel is of a conical horn that is tapered off toward the spray opening.

18. The solution reactor as recited in claim 15, wherein the barrel is of an exponential horn.

19. The solution reactor as recited in claim 15, wherein the gas nozzle is opened to circumferentially surround the spray opening.

20. The solution reactor as recited in claim 15, wherein the reactant gas is air that contains ozone and the solution contains an organic matter that is oxidatively decomposed in contact with ozone.

21. The solution reactor as recited in claim 15, wherein a collection unit is separated from and interconnected to the ultrasonic atomization chamber through a circulation duct.

22. The solution reactor as recited in claim 15, wherein a collection unit is incorporated into the ultrasonic atomization chamber.

23. The solution reactor as recited in claim 15, wherein a collection unit and the ultrasonic atomization chamber are formed as an air-tight chamber.

* * * * *

UNITED STATES PATENT AND TRADEMARK OFFICE
CERTIFICATE OF CORRECTION

PATENT NO. : 8,273,252 B2
APPLICATION NO. : 11/921466
DATED : September 25, 2012
INVENTOR(S) : Kazuo Matsuura et al.

Page 1 of 1

It is certified that error appears in the above-identified patent and that said Letters Patent is hereby corrected as shown below:

ON THE TITLE PAGE:

Insert the following:

-- (30)    Foreign Application Priority Data

Jun. 3, 2005    (JP) .................... 2005-164895 --.

Signed and Sealed this
Twenty-second Day of January, 2013

David J. Kappos
*Director of the United States Patent and Trademark Office*